(12) United States Patent
Yu et al.

(10) Patent No.: US 12,495,466 B2
(45) Date of Patent: Dec. 9, 2025

(54) DRX METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Xinlei Yu, Guangdong (CN); Haitao Li, Guangdong (CN); Yi Hu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 316 days.

(21) Appl. No.: 18/342,266

(22) Filed: Jun. 27, 2023

(65) Prior Publication Data

US 2023/0345577 A1  Oct. 26, 2023

Related U.S. Application Data

(63) Continuation of application No. PCT/CN2020/140373, filed on Dec. 28, 2020.

(51) Int. Cl.
*H04L 1/1812* (2023.01)
*H04L 1/1829* (2023.01)
*H04W 72/20* (2023.01)
*H04W 76/28* (2018.01)

(52) U.S. Cl.
CPC .......... *H04W 76/28* (2018.02); *H04L 1/1854* (2013.01); *H04W 72/20* (2023.01); *H04L 1/1812* (2013.01)

(58) Field of Classification Search
CPC ... H04L 1/1822; H04L 1/1851; H04L 1/1896; H04L 1/1812; H04L 1/188; H04L 1/1886; H04W 76/15; H04W 76/28

USPC .......... 370/278, 329, 252
See application file for complete search history.

(56) References Cited

U.S. PATENT DOCUMENTS

| 7,269,151 | B2 * | 9/2007 | Diener | H04L 1/1664 370/329 |
|---|---|---|---|---|
| 9,270,399 | B2 * | 2/2016 | Ahn | H04L 1/1635 |
| 9,986,577 | B2 * | 5/2018 | Bose | H04W 52/34 |
| 10,531,385 | B2 | 1/2020 | Wei | |
| 10,778,375 | B2 | 9/2020 | Chai | |
| 11,297,677 | B2 * | 4/2022 | Babaei | H04L 5/0078 |
| 11,523,457 | B2 * | 12/2022 | He | H04W 76/28 |

(Continued)

FOREIGN PATENT DOCUMENTS

CN   106992846 A   7/2017
CN   108476481 A   8/2018
(Continued)

OTHER PUBLICATIONS

International Search Report in the international application No. PCT/CN2020/140373, mailed on Sep. 23, 2021. 6 pages with English translation.

(Continued)

*Primary Examiner* — John Pezzlo
(74) *Attorney, Agent, or Firm* — Ladas & Parry LLP

(57) ABSTRACT

A DRX method, a terminal device and a network device are provided. The method includes: a first discontinuous reception hybrid automatic repeat request round trip time timer (drx-HARQ-RTT-Timer) is configured based on a round trip time (RTT) corresponding to a serving cell associated with a data transmission.

18 Claims, 21 Drawing Sheets

(56) References Cited

U.S. PATENT DOCUMENTS

| | | | |
|---|---|---|---|
| 2015/0312889 A1* | 10/2015 | Lee | H04L 1/1812 370/280 |
| 2018/0332479 A1 | 11/2018 | Chai et al. | |
| 2019/0037637 A1* | 1/2019 | Suzuki | H04W 72/23 |
| 2019/0044639 A1 | 2/2019 | Ouchi et al. | |
| 2019/0053159 A1 | 2/2019 | Wei et al. | |
| 2019/0173618 A1* | 6/2019 | Yin | H04L 1/1854 |
| 2019/0364433 A1* | 11/2019 | Das | G06N 5/045 |
| 2020/0045768 A1 | 2/2020 | He et al. | |
| 2020/0314948 A1 | 10/2020 | Babaei | |
| 2020/0412486 A1 | 12/2020 | Chai et al. | |
| 2021/0298041 A1* | 9/2021 | Zhang | H04L 1/1822 |
| 2022/0183104 A1 | 6/2022 | Babaei | |
| 2022/0393836 A1* | 12/2022 | Wirth | H04L 1/1822 |

FOREIGN PATENT DOCUMENTS

| | | |
|---|---|---|
| CN | 110999413 A | 4/2020 |
| CN | 111050423 A | 4/2020 |
| CN | 111757436 A | 10/2020 |
| KR | 20200040193 A | 4/2020 |
| WO | 2020027955 A2 | 2/2020 |
| WO | 2020065469 A1 | 4/2020 |

OTHER PUBLICATIONS

Written Opinion of the International Search Authority in the international application No. PCT/CN2020/140373, mailed on Sep. 23, 2021. 8 pages with English translation.

3GPP TSG-RAN WG2 Meeting #112 electronic R2-2010702, Online, Nov. 2-13, 2020, Agenda item: 10.2, Source: Vice Chairman (ZTE Corporation), Title: Report from Break-out session on R16 eMIMO, CLI, PRN, RACS and R17 NTN and REDCAP, Document for: Approval. 50 pages.

OPPO: "Discussion on DRX operation in NTN", 3GPP Draft; R2-1913336, 3rd Generation Partnership Project (3GPP), Mobilecompetence Centre ; 650, Route Des Lucioles ; F-06921 Sophia-Antipolis Cedex; France vol. RAN WG2, No. Chongqing, China; Oct. 14, 2019-Oct. 18, 2019, Oct. 3, 2019 (Oct. 3, 2019), XP051791342,the whole document, 5 pages.

Supplementary European Search Report in the European application No. 20967328.4, mailed on Mar. 1, 2024, 11 pages.

\* cited by examiner

DRX METHOD, TERMINAL DEVICE, AND NETWORK DEVICE

CROSS-REFERENCE TO RELATED APPLICATION

This application is a continuation of International Application No. PCT/CN2020/140373 filed on Dec. 28, 2020. The entire contents of which are hereby incorporated by reference in its entirety.

BACKGROUND

With regard to new radio (NR) DRX, after a hybrid automatic repeat reQuest (HARQ) transmission, the terminal device will wait for at least one round trip time (RTT) length before receiving the retransmission scheduling instruction, it is possible to save the power of the terminal device by not monitoring the physical downlink control channel (PDCCH) during the downlink (uplink) discontinuous reception hybrid automatic repeat request round trip time timer (drx-HARQ-RTT-TimerDL(UL)) time.

In non-terrestrial networks (NTN), considering the scenario of satellite with transparent payload, carrier aggregation (CA) between terrestrial networks (TN) and NTN, as well as CA between NTN and NTN may be considered for practical deployment in order to improve the transmission rate of a terminal. However, there may be significant difference in RTTs, between the UE and gNB, in different TN cells and NTN cells in which CA is performed. When considering cross-carrier scheduling, one uplink/downlink HARQ transmission and a possible subsequent retransmission scheduling may be on different carriers (serving cells). In this case, the existing configuration method of drx-HARQ-RTT-TimerDL(UL) does not achieve power saving for the terminal device, or may cause the terminal device to start a downlink (uplink) discontinuous reception retransmission timer (drx-Retransmission-TimerDL(UL)) at a wrong time to monitor the PDCCH and miss the retransmission scheduling.

SUMMARY

The present disclosure relates to a field of communication technology, in particular to a discontinuous reception (DRX) method, a terminal device and a network device.

In a first aspect, a DRX method is provided. The method includes the following operation. A first discontinuous reception hybrid automatic repeat request round trip time timer (drx-HARQ-RTT-Timer) is configured based on a round trip time (RTT) corresponding to a serving cell associated with a data transmission.

In a second aspect, a terminal device is provided. The terminal device includes a memory and a processor. The memory storing a computer program that, when executed by the processor, causes the processor to configure a first drx-HARQ-RTT-Timer based on an RTT corresponding to a serving cell associated with a data transmission.

In a third aspect, a network device is provided. The network device includes a memory, a transceiver and a processor, the memory storing a computer program that, when executed by the processor, causes the transceiver to transmit a target PDCCH for instructing the terminal device to perform a data transmission to a terminal device.

DETAILED DESCRIPTION

Figure 1:
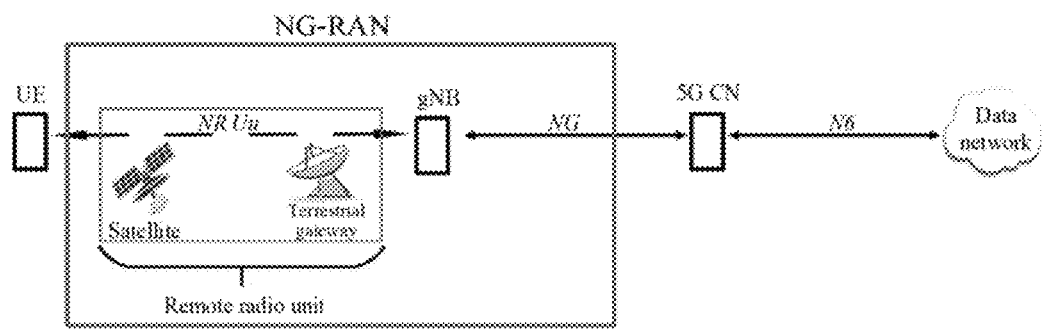
FIG. 1 is a first schematic diagram of a transparent payload satellite network architecture provided by an embodiment of the present disclosure.

The technical solutions of the embodiments of the present disclosure will be described below in conjunction with the accompanying drawings in the embodiments of the present disclosure. It is apparent that the described embodiments are only part of the embodiments of the present disclosure, and not all of them. Based on the embodiments in the present disclosure, all other embodiments obtained by those skilled in the art without creative efforts fall within the scope of protection of the present disclosure.

In embodiments of the present disclosure, the words such as "exemplarily" or "for example" are used for taking examples, illustrations, or explanation. Any embodiments or design solutions described as "exemplarily" or "for example" in embodiments of the present disclosure should not be construed as being more preferred or advantageous than other embodiments or design solutions. Rather, the use of the words "exemplarily" or "for example" is intended to present the relevant concepts in a specific manner.

In the present disclosure, the term "and/or" is merely used for describing an association relationship of associated objects, and indicates that three relationships may exist. For example, A and/or B may represent three situations: A exists alone, both A and B exist, and B exists alone. In the present disclosure, the symbol "/" indicates that a relationship of the associated objects is or, for example, A/B indicates A or B.

In the description of the present disclosure, unless otherwise stated, "multiple" means two or more. The technical solutions provided by the present disclosure can be applied to various communication systems, such as a 5G communication system, a future evolution system, a fusion system of multiple communications, and the like. Various application scenarios may be included, such as machine to machine (M2M), Device to machine (D2M), macro-micro communication, enhance mobile broadband (eMBB), ultra-reliable & low latency communication (uRLLC) and massive machine type communication (mMTC), and the like. For example, the embodiments of the present disclosure may be applied to the communication between the network device and the terminal device in NR-U of the 5G communication system.

NTN Related Background

At present, 3GPP is researching the technology of non-terrestrial network (NTN), which generally uses satellite communication to provide communication services to terrestrial users. Compared with terrestrial cellular network communication, satellite communication has the following advantages.

First of all, satellite communication is not limited by user areas. For example, general terrestrial communication cannot cover areas such as oceans, mountains, deserts, etc., where communication device cannot be set up or communication coverage is not provided due to sparse population. For the satellite communication, because a single satellite can cover a large ground area and the satellite can orbit around the earth, every corner of the earth can theoretically be covered by satellite communication.

Secondly, satellite communication has great society value. The remote mountainous areas, poor and backward countries or regions can be covered by the satellite communication at a lower cost, so that people in these areas can enjoy advanced voice communication and mobile internet technology, which is conducive to narrowing the digital divide with developed areas and promoting the development of these areas.

Thirdly, the satellite communication distance is long, and the communication cost does not increase significantly with the increase of communication distance. Finally, satellite communication has high stability and is not limited by natural disasters.

Communication satellites can be divided into low-earth orbit (LEO) satellite, medium-earth orbit (MEO) satellite, geostationary earth orbit (GEO) satellite, high elliptical orbit (HEO) satellite and so on based on different orbital altitudes. At present, the main research focuses on LEO and GEO.

1. LEO

The altitude range of LEO satellites is 500 km-1500 km, and the corresponding orbital cycle is about 1.5 hours-2 hours. The signal propagation delay of single-hop communication between the user equipment and the satellite is generally less than 20 ms. The maximum satellite visual time is 20 minutes. The signal propagation distance is short, the link loss is low, and the requirement for transmission power of the user terminal is not high.

2. GEO

GEO satellite has an orbital altitude of 35786 km and a 24-hour rotation cycle around the Earth. The signal propagation delay for single-hop communication between the user equipment and the satellite is generally 250 ms.

In order to ensure the coverage of satellite and to increase the system capacity of the entire satellite communication system, a satellite uses multiple beams to cover the ground, and one satellite can form dozens or even hundreds of beams to cover the ground. One satellite beam can cover a ground area with a diameter of tens to hundreds of kilometers.

At present, there are two types of satellite network architectures being considered by 3GPP, one is transparent payload satellite network architecture, and the other is regenerative payload satellite network architecture.

Exemplarily, FIG. 1 is a schematic diagram of a transparent payload satellite network architecture, which includes a 5G access network (NG-RAN) composed of a user equipment (UE), a base station (gNB), a satellite and a terrestrial network gateway (TN gateway), a 5G core network (5G CN) and a data network. The UE is connected to the gNB through a new radio (NR) Uu interface (i.e., universal user network interface), the base station is connected to the 5G CN through a NG interface, and the 5G CN is connected to the data network through a N6 interface. The satellite and the terrestrial network gateway form a remote radio unit (RRU). During a process of a data transmission between UE and gNB, the data is forwarded through the satellite and the terrestrial network gateway, and the satellite and the terrestrial network gateway do not do protocol stack processing for the data during the forwarding process, thus realizing the transparent payload.

Figure 2:
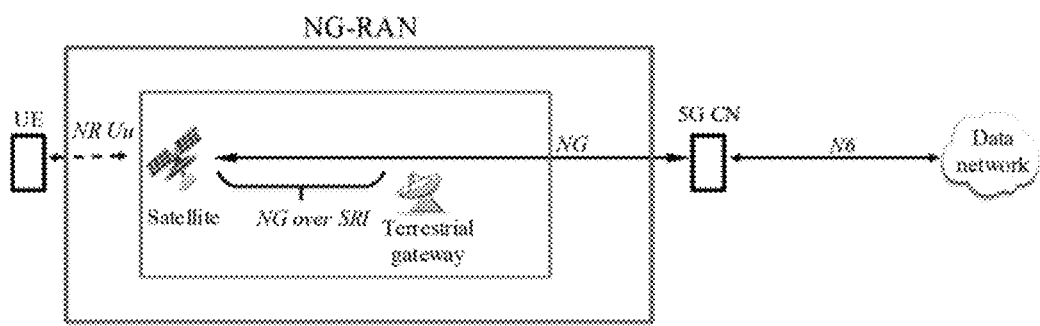
FIG. 2 is a second schematic diagram of a regenerative payload satellite network architecture provided by an embodiment of the present disclosure.

Exemplarily, FIG. 2 is a schematic diagram of a regenerative payload satellite network architecture, which includes an NG-RAN composed of a UE, a satellite and a terrestrial gateway, a 5G CN and a data network. The UE is connected to the satellite through a NR Uu interface, the satellite is connected to the 5G CN through a NG interface, and the 5G CN is connected to the data network through a N6 interface. The satellite is connected to the NTN gateway through an NG interface operating on a satellite radio interface (SRI), i.e., NG over SRI. When UE performs a data transmission, the data is forwarded by the satellite, which will make protocol stack processing for the data during the forwarding process, thus realizing the regenerative payload.

Carrier Aggregation (CA) Technology

In order to provide greater data transmission rate and improve user experience, 5G NR further increases the system bandwidth based on 4G. In 5G NR, for the frequency band below 6 GHz, the maximum bandwidth supported by single carrier is 100 MHz. For the frequency band above 6 GHz, the maximum bandwidth supported by a single carrier is 400 MHz.

Like the LTE system, CA technology is also supported in 5G NR.

Figure 3A:
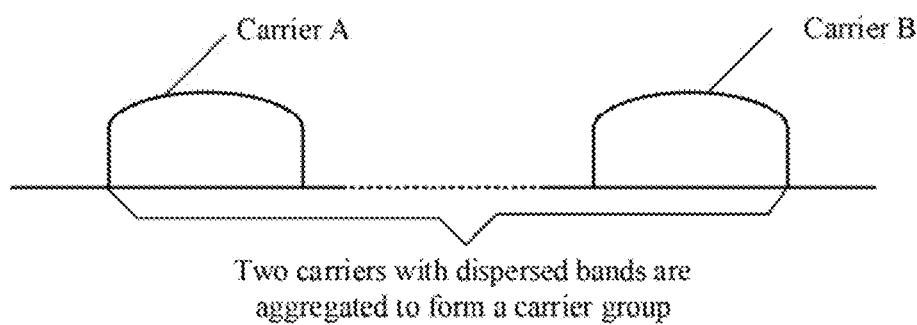
FIG. 3A is a first schematic diagram of a carrier aggregation (CA) concept provided by an embodiment of the present disclosure.

FIG. 3A is a schematic diagram of a CA concept, in which two carriers with dispersed frequency bands are aggregated to form a carrier group. It is assumed that the bandwidths of both carrier A and carrier B are 20 MHz, then the total bandwidth of the aggregated carrier group is 40 MHz.

Figure 3B:
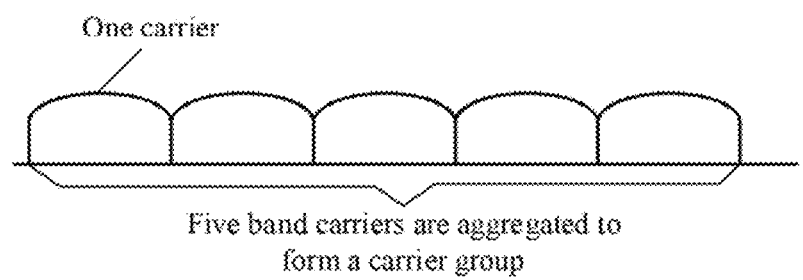
FIG. 3B is a second schematic diagram of a carrier aggregation (CA) concept provided by an embodiment of the present disclosure.

FIG. 3B is another schematic diagram of a CA concept, in which five carriers are aggregated to form a carrier group. It is assumed that the bandwidth of each carrier is 20 MHz, then the total bandwidth of the aggregated carrier group is 100 MHz.

The resources on multiple component carriers (CCs) are jointly scheduled and used in CA technology, so that NR system can support larger bandwidth and achieve higher system peak rate. The CA can be divided into continuous CA and discontinuous CA based on the continuity of the aggregated carriers in spectrum. And the CA can be divided into intra-band carrier aggregation and inter-band carrier aggregation based on whether the frequency bands of the aggregated carriers are the same.

CA scenarios may include primary cell component (PCC) and secondary cell component (SCC).

Figure 3C:
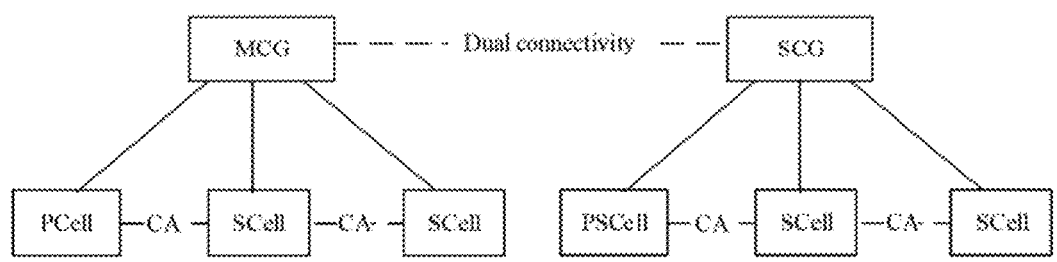
FIG. 3C is a schematic diagram of a dual connectivity CA scenario provided by an embodiment of the present disclosure.

FIG. 3C is a schematic diagram of a dual connected CA scenario. The dual connected scenario includes a master cell group (MCG) and a secondary cell group (SCG). The MCG is formed by aggregating the PCC of one primary cell (PCell) and the SCCs of two secondary cells (SCell), and the SCG is formed by aggregating the PCC of one PCell and the SCCs of two SCells. The PCell of SCG is also referred to as the primary SCG cell (PSCell).

In a cell group, there is only one PCC, which provides radio resource control (RRC) signaling connection, network attached storage (NAS) function and so on. The SCC provides additional radio resources. PCC and SCC are both referred to as serving cells, PCC corresponds to primary serving cell (PCell) and SCC corresponds to secondary serving cell (SCell).

For a terminal device that supports CA characteristic, the terminal device has one PCell, and the network device can also configure one or more SCells for the terminal device. It is stipulated in the standard that the aggregated carriers belong to the same base station, and all aggregated carriers use the same cell radio network temporary identifier (C-RNTI). The base station can ensure that the C-RNTI in the cell where each carrier is located is not conflicted with each other. Because both asymmetric carrier aggregation and symmetric carrier aggregation can be supported, it is required that there must be the downlink carrier in the aggregated carrier, and there may not be the uplink carrier in the aggregated carrier.

There are active state and inactive state for the SCell. Only when the SCell is in the active state, the terminal device can send and receive data on the SCell. SCell is configured through RRC dedicated signaling, and the configured initial state is the deactivated state, in which sending and receiving of data cannot be performed. After the SCell is activated through the media access control control element (MAC CE), sending and receiving of data can be performed. From the perspective of the latency of configuration and activation of SCell, this architecture is not an optimal architecture, and this latency reduces the efficiency of CA usage and radio resources, especially in small cell deployment scenarios. In the dense small cell deployment scenario, the signaling load of each SCell is very high, especially when each S Cell needs to be configured individually. Therefore, an extra delay is introduced in the current CA architecture, which limits the use of CA and reduces the gain of CA load sharing.

The terminal device can simultaneously monitor PDCCH on both the PCell and one or more activated SCells, and send and receive data, thereby increasing the data transmission rate. The physical uplink control channel (PUCCH) is on the PCell. In addition, if it is supported by the terminal device, the network device can configure PUCCH for up to one additional SCell in the same cell group, and the SCell is referred to as PUCCH SCell. That is, for the PCell, there must be a PDCCH and a PUCCH for this cell, while for other SCells, there may be a PDCCH, and a PUCCH may exists on one of these SCells.

In the current NR, for the downlink physical downlink share channel (PDSCH) on the PCell and the PUCCH SCell, the PUCCH corresponding to the hybrid automatic repeat request (HARQ) feedback of the terminal device is located on its own cell. For the PDSCH downlink transmission of other non-PUCCH SCell, it is supported that PUCCH corresponding to HARQ feedback of UE is semi-statically configured, through radio resource control (RRC), to be located on PUCCH SCell or PUCCH PCell, and the relationship is unique.

At present, in NR, it is supported that cross-carrier scheduling is semi-statically configured through RRC. That is, for the PDSCH or the PUSCH of a PCell, the PDCCH scheduling the PDSCH or the PUSCH is also located on the PCell. For the PDSCH or the PUSCH of an SCell, in addition to scheduling the PDSCH or the PUSCH through the PDCCH of the Scell, the PDSCH or the PUSCH can also be scheduled by a PDCCH of the PCell or a PDCCH of other SCells, but for a specific SCell, the PDCCH scheduling the PDSCH or PUSCH transmission is unique.

5G NR Discontinuous Reception (DRX) Process

In 5G NR, the network device can configure DRX function for a terminal device, so that the terminal device can monitor PDCCH discontinuously, so as to achieve the purpose of saving power for the terminal device. Each MAC entity has a DRX configuration, and the configuration parameters of DRX include:
  (1) drx-onDurationTimer: the duration at the beginning of a DRX cycle;
  (2) drx-SlotOffset: the delay before starting the drx-onDurationTimer;
  (3) drx-InactivityTimer: the duration after the PDCCH occasion in which a PDCCH indicates a new UL or DL transmission for the MAC entity;
  (4) drx-RetransmissionTimerDL (for each DL HARQ process except broadcast process): the maximum duration until a DL retransmission is received;
  (5) drx-RetransmissionTimerUL (for each uplink HARQ process): the maximum duration until a grant for UL retransmission is received;
  (6) drx-LongCycleStartOffset: the Long DRX cycle and drx-StartOffset which defines the subframe where the long and short DRX cycle starts;
  (7) drx-ShortCycle (optional): the short DRX cycle;
  (8) drx-ShortCycleTimer (optional): the duration the UE shall follow the short DRX cycle;
  (9) drx-HARQ-RTT-TimerDL (for each DL-HARQ process except broadcast process): the minimum duration before a DL assignment for HARQ retransmission is expected by the MAC entity of the UE;
  (10) drx-HARQ-RTT-TimerUL (for UL HARQ process): the minimum duration before a UL HARQ retransmission grant is expected by the MAC entity of the UE.

If the terminal device is configured with DRX, the terminal device needs to monitor PDCCH during the DRX activation period. DRX activation period includes the following cases:

Case 1: Any one of the five timers: drx-onDurationTimer, drx-InactivityTimer, drx-RetransmissionTimerDL, drx-RetransmissionTimerUL and ra-ContentionResolutionTimer, is running;

Case 2: Scheduling request (SR) is sent on PUCCH and is in a pending state;

Case 3: During contention-based random access, the terminal device has not received an initial transmission indicated by the PDCCH scrambled by the C-RNTI, after successfully receiving the random access response.

The terminal device determines the time to start the drx-onDurationTimer based on whether it is currently in short DRX cycle or long DRX cycle, as specified below:

1> If the short DRX cycle is used, and the current subframe satisfies [(SFN×10)+subframe number] modulo (drx-ShortCycle)=(drx-StartOffset) modulo (drx-ShortCycle); or, 2> If the long DRX Cycle is used, and the current subframe satisfies [(SFN×10)+subframe number] modulo (drx-LongCycle)=drx-StartOffset.

Then, the drx-onDurationTimer is started at the moment after the drx-SlotOffset slots at the beginning of the current subframe.

SFN is the system frame number, subframe number is the subframe number where the physical random access channel (PRACH) resource is located, drx-ShortCycle is DRX short cycle, drx-LongCycle is DRX long cycle, and drx-StartOffset is DRX start slot offset.

Figure 4:
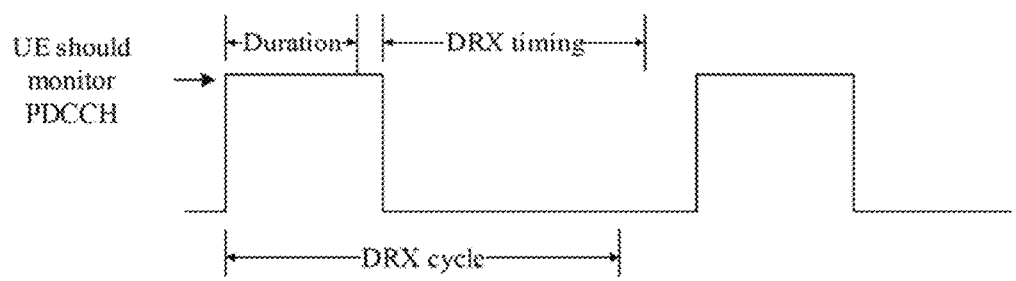
FIG. 4 is a schematic diagram of a DRX Cycle provided by an embodiment of the present disclosure.

FIG. 4 is a schematic diagram of a DRX cycle. The terminal device starts or restarts the drx-InactivityTimer on the condition that the terminal device receives a PDCCH indicating an initial downlink or uplink transmission. In FIG. 4, after the terminal device receives the PDCCH indicating the initial downlink or uplink transmission, the DRX-InactivityTimer can be started or restarted to enter the On Duration (also referred to as the activation period) during which data can be received, and no data can be received during the Opportunity for DRX (also referred to as the dormant period) in the whole DRX Cycle.

Figure 5:
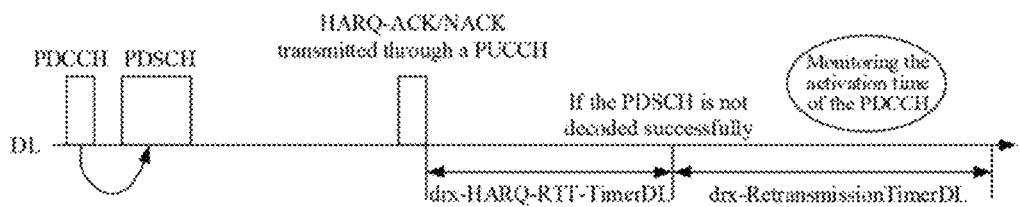
FIG. 5 is a first schematic diagram of starting and stopping conditions of a drx-RetransmissionTimerDL provided by an embodiment of the present disclosure.

FIG. 5 is a schematic diagram of starting and stopping conditions of a drx-RetransmissionTimerDL. When the terminal device receives a PDCCH indicating downlink transmission, or when the terminal device receives a media access control (MAC) protocol data unit (PDU) on a configured downlink grant resource, the terminal device stops the drx-RetransmissionTimerDL corresponding to the HARQ process. The terminal device starts the drx-HARQ-RTT-TimerDL corresponding to the HARQ process after completing the transmission of the HARQ process feedback for this downlink transmission.

If a timer drx-HARQ-RTT-TimerDL corresponding to a certain HARQ of the terminal device expires, and the downlink data transmitted by the HARQ process is not decoded successfully, the terminal device starts the drx-RetransmissionTimerDL corresponding to the HARQ process.

Figure 6:
FIG. 6 is a first schematic diagram of starting and stopping conditions of a drx-RetransmissionTimerUL provided by an embodiment of the present invention.

FIG. 6 is a schematic diagram of starting and stopping conditions of a drx-RetransmissionTimerUL. When a terminal device receives a PDCCH indicating uplink transmission, or when the terminal device sends a MAC PDU on a configured uplink grant resource, the terminal stops the drx-RetransmissionTimerUL corresponding to the HARQ process. The terminal device starts the drx-HARQ-RTT-TimerUL corresponding to the HARQ process after completing the first repeat transmission (repetition) of the PUSCH.

If a timer drx-HARQ-RTT-TimerUL corresponding to a certain HARQ of the terminal device expires, the terminal device starts the drx-RetransmissionTimerUL corresponding to the HARQ process.

Figure 7A:
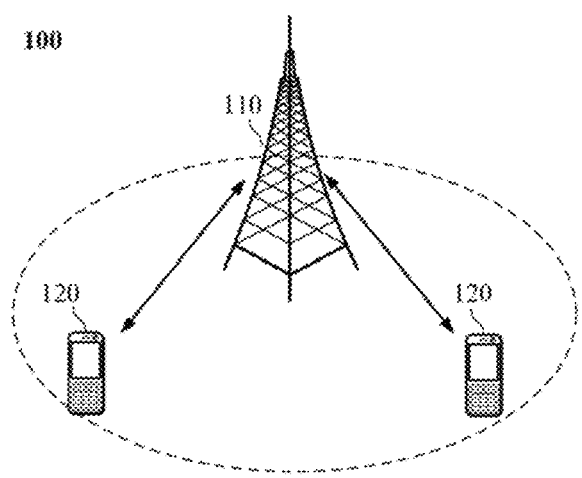
FIG. 7A is a first schematic diagram of an architecture of a communication system provided by an embodiment of the present disclosure.

Exemplarily, FIG. 7A is a schematic diagram of an architecture of a communication system provided by an embodiment of the present disclosure. As shown in FIG. 7A, the communication system 100 may include a network device 110. The network device 110 may be a device that communicates with a terminal device 120 (or, referred to as a communication terminal or a terminal). The network device 110 may provide communication coverage for a particular geographic area and may communicate with terminal devices located within the coverage area.

FIG. 7A exemplarily illustrates one network device and two terminal devices. Alternatively, the communication system 100 may include multiple network devices, and may include other numbers of terminal devices within the coverage area of each network device, which is not limited by the embodiments of the present disclosure.

Figure 7B:
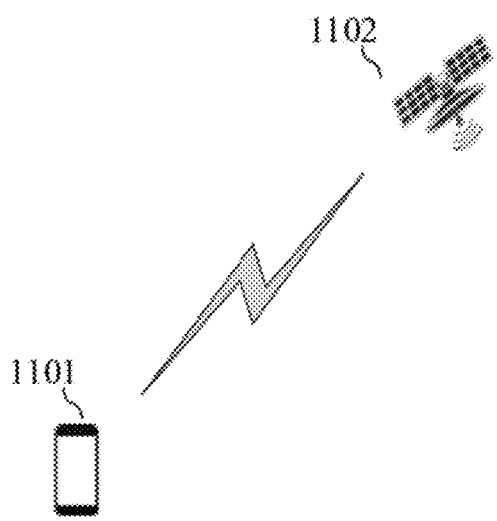
FIG. 7B is a second schematic diagram of an architecture of a communication system provided by an embodiment of the present disclosure.

Exemplarily, FIG. 7B is a schematic diagram of an architecture of another communication system provided by an embodiment of the present disclosure. As shown in FIG. 7B, the communication system includes a terminal device 1101 and a satellite 1102. The wireless communication may be performed between the terminal device 1101 and the satellite 1102. The network formed between the terminal device 1101 and the satellite 1102 may also be referred to as an NTN. In the architecture of the communication system shown in FIG. 7B, the satellite 1102 may function as a base station, and direct communication may be performed between the terminal device 1101 and the satellite 1102. Under the system architecture, the satellite 1102 can be referred to as a network device. Alternatively, the communication system may include multiple network devices 1102, and may include other numbers of terminal devices within the coverage area of each network device 1102, which is not limited by the embodiments of the present disclosure.

Figure 7C:
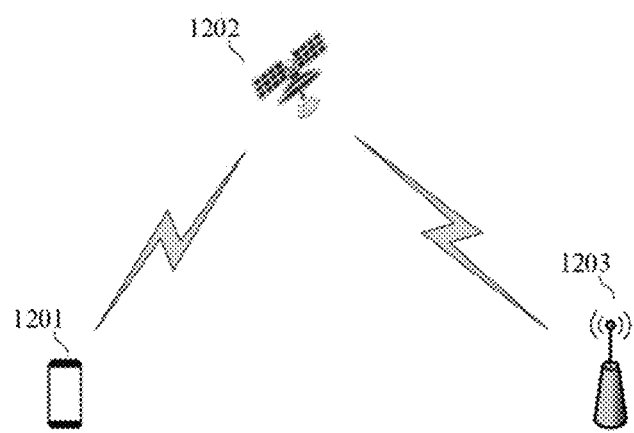
FIG. 7C is a third schematic diagram of an architecture of a communication system provided by an embodiment of the present disclosure.

Exemplarily, FIG. 7C is a schematic diagram of an architecture of another communication system provided by an embodiment of the present disclosure. As shown in FIG. 7C, the communication system includes a terminal device 1201, a satellite 1202, and a base station 1203. The wireless communication may be performed between the terminal device 1201 and the satellite 1202, and the communication may be performed between the satellite 1202 and the base station 1203. The network formed among the terminal device 1201, the satellite 1202 and the base station 1203 may also be referred to as an NTN. In the architecture of the communication system shown in FIG. 7C, the satellite 1202 may not function as a base station, and the communication between the terminal device 1201 and the base station 1203 need to be relayed through the satellite 1202. In this system architecture, the base station 1203 may be referred to as a network device. Alternatively, the communication system may include multiple network devices 1203, and may include other numbers of terminal devices within the coverage area of each network device 1203, which is not limited by embodiments of the present disclosure.

It should be noted that FIG. 7A to FIG. 7C are only illustrative examples of the system to which the present disclosure applies. Of course, the methods illustrated in the embodiments of the present disclosure can also be applied to other systems, such as, a 5G communication system, an LTE communication system, etc., which are not limited by the embodiments of the present disclosure.

Alternatively, the wireless communication systems illustrated in FIG. 7A to FIG. 7C may also include other network entities such as a mobility management entity (MME), an access and mobility management function (AMF), etc., which are not limited by the embodiments of the present disclosure.

In the related art, after one HARQ transmission, the terminal device will wait for at least one RTT length before receiving a retransmission scheduling indication, so that the power of the terminal device can be saved by not monitoring the PDCCH during drx-HARQ-RTT-TimerDL(UL) time.

In the NTN, considering the transparent payload satellite scenario, in order to improve the transmission rate of a terminal device, CA between TN and NTN and CA between NTN and NTN can be considered for practical deployment. However, there may be significant difference in RTTs, between the UE and gNB, in different TN cells and NTN cells in which CA is performed. When considering cross-carrier scheduling, one uplink/downlink HARQ transmission and a possible subsequent retransmission scheduling may be on different carriers (serving cells). In this case, the existing configuration method of drx-HARQ-RTT-TimerDL (UL) cannot achieve the power saving of the terminal device, or may cause the terminal device to start drx-Retransmission-TimerDL(UL) at a wrong time to monitor the PDCCH and miss the retransmission scheduling.

Based on the above problems, in the DRX method provided by the embodiments of the present disclosure, a drx-HARQ-RTT-TimerDL(UL) is configured based on an RTT of a serving cell associated with a data transmission. Therefore, for the situation that one uplink/downlink HARQ transmission and a possible subsequent retransmission scheduling are on different carriers (serving cells), the drx-HARQ-RTT-TimerDL(UL) can be configured based on the RTT of the serving cell associated with the uplink HARQ transmission and/or the RTT of the serving cell associated with the downlink HARQ transmission, so that a suitable slot offset for delaying a start of the drx-HARQ-RTT-TimerDL(UL) can be determined, or the duration of the drx-HARQ-RTT-TimerDL(UL) can be prolonged, so as to achieve the purpose of power saving of the terminal device, or cause the terminal device to start the drx-Retransmission-TimerDL(UL) at a suitable time to monitor PDCCH.

The terminal device in the embodiments of the present disclosure may be referred to as a user equipment (UE). The terminal device may be a personal communication service (PCS) telephone, a cordless telephone, a session initiation protocol (SIP) telephone, a wireless local loop (WLL) station, a personal digital assistant (PDA), etc. The terminal device may also be a mobile phone, a mobile station (MS), a mobile terminal (MS), a laptop, etc. The terminal device may communicate with one or more core networks via a radio access network (RAN). For example, the terminal device may be a mobile telephone (or referred to as a "cellular" telephone) or a computer with a mobile terminal, etc. For example, the terminal device may also be a portable, pocket-sized, hand-held, computer-built or vehicle-mounted mobile device that exchanges voice and/or data with a wireless access network. The terminal device may also be a handheld device with wireless communication function, a computing device or other processing device connected to a wireless modem, a vehicle-mounted device, a wearable device, a terminal device in a future 5G network or a terminal device in a future evolved network, etc. The above is only an example, and is not limited to this in practical application.

The network device in the embodiments of the present disclosure may be an evolutional node B (eNB or e-NodeB), a macro base station, a micro base station (also referred to as "small base station"), a pico base station, an access point (AP), a transmission point (TP) or a new generation node B (gNodeB) in an LTE system, an NR communication system or an authorized auxiliary access long-term evolution (LAA-LTE) system. The above-mentioned network device may also be other types of network devices in a future 5G communication system or a future evolved network.

An embodiment of the present disclosure provides a DRX method. A network device sends a target PDCCH for instructing the terminal device to perform a data transmission to a terminal device. The terminal device configures a first drx-HARQ-RTT-Timer based on an RTT corresponding to a serving cell associated with the data transmission.

Optionally, the target PDCCH instructs the terminal device to perform a data transmission on an SCell.

Optionally, the operation of configuring the first drx-HARQ-RTT-Timer in the embodiments of the present disclosure may include the following two specific cases: case 1: configuring a slot offset for delaying a start of the first drx-HARQ-RTT-Timer; case 2: prolonging a duration of the first drx-HARQ-RTT-Timer.

Optionally, in the embodiments of the present disclosure, for an SCell in a CA scenario, the first drx-HARQ-RTT-Timer may be configured based on the RTT corresponding to the serving cell associated with the data transmission in the SCell.

The data transmission in the embodiments of the present disclosure may include downlink (DL) PDSCH transmission or uplink (UL) PUSCH transmission.

In the embodiments of the present disclosure, the first drx-HARQ-RTT-Timer may include a drx-HARQ-RTT-TimerDL, or a drx-HARQ-RTT-TimerUL.

Since the two cases of configuring the drx-HARQ-RTT-TimerDL for the downlink PDSCH transmission and configuring the drx-HARQ-RTT-TimerUL for the uplink PUSCH transmission are different in specific implementations, the two cases will be explained separately below.

In the embodiments of the present disclosure, the drx-HARQ-RTT-TimerDL(UL) may be configured based on the RTT of the serving cell associated with the data transmission. Therefore, for the situation that one uplink/downlink HARQ transmission and a possible subsequent retransmission scheduling are on different carriers (serving cells), the drx-HARQ-RTT-TimerDL(UL) can be configured based on the RTT of the serving cell associated with the uplink HARQ transmission and/or the RTT of the serving cell associated with the downlink HARQ transmission, so that a suitable slot offset for delaying a start of the drx-HARQ-RTT-TimerDL(UL) can be determined, or the duration of the drx-HARQ-RTT-TimerDL(UL) can be prolonged, so as to achieve the purpose of power saving of the terminal device, or cause the terminal device to start the drx-Retransmission-TimerDL(UL) at a suitable time to monitor PDCCH.

First Embodiment

The data transmission is downlink PDSCH transmission.

Figure 8:
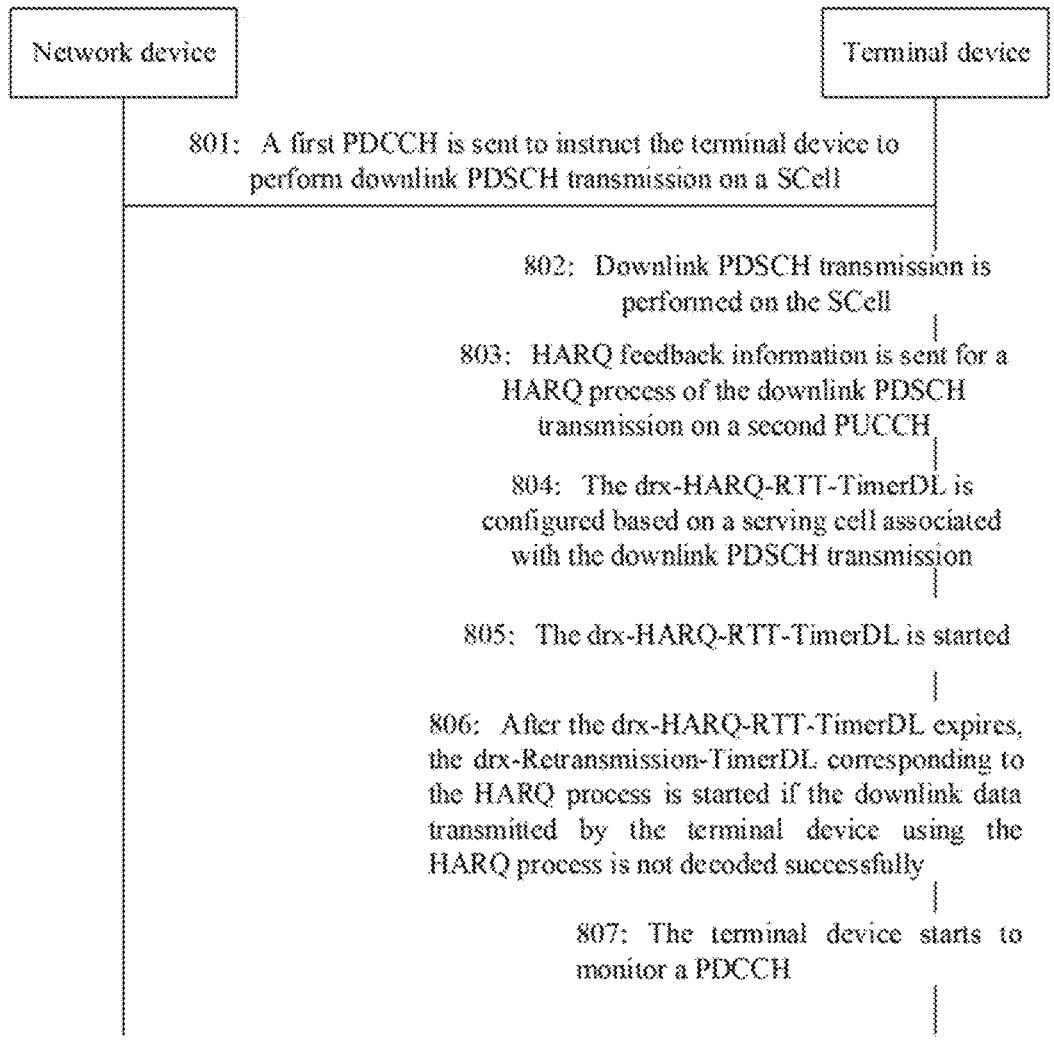
FIG. 8 is a first schematic diagram of a DRX method provided by an embodiment of the present disclosure.

As illustrated in FIG. 8, an embodiment of the present disclosure provides a DRX method. The method includes the following operations.

In an operation 801, a network device sends a first PDCCH to a terminal device to instruct the terminal device to perform downlink PDSCH transmission on an SCell.

Optionally, the terminal device receives an RRC reconfiguration message sent by the network device, and the RRC reconfiguration message may configures one or more SCells.

In the embodiment of the present disclosure, in the dual connectivity scenario, the SCell may be a secondary cell in the master cell group or a secondary cell in the secondary cell group. The secondary cell in the secondary cell group may also be denoted as a PSCell.

Further, the network device may send the first PDCCH for instructing the terminal device to perform the downlink PDSCH transmission on the SCell to the terminal device. Accordingly, the terminal device receives the first PDCCH and performs the following operation 802.

In the operation 802, the terminal device performs the downlink PDSCH transmission on the SCell.

Optionally, the embodiment of the present disclosure may be applied to the downlink PDSCH transmission process in the SCell in the CA scenario.

In an operation 803, the terminal device sends HARQ feedback information for a HARQ process of the downlink PDSCH transmission on the second PUCCH.

Optionally, after performing the downlink transmission, the terminal device needs to send HARQ feedback information to the network device for the HARQ process of the downlink PDSCH transmission on the second PUCCH.

In an operation 804, the terminal device configures the drx-HARQ-RTT-TimerDL based on a serving cell associated with downlink PDSCH transmission.

Optionally, the serving cell associated with the downlink PDSCH transmission includes:
(1) a first cell where a first physical downlink control channel (PDCCH) for scheduling the downlink PDSCH transmission is located;
(2) a second cell which corresponds to the downlink PDSCH transmission and where a second physical uplink control channel (PUCCH) for feeding back HARQ feedback information is located;
(3) the first cell and the second cell.

Optionally, the first cell may be the same cell as the second cell.

Optionally, the first cell may be different from the second cell.

Optionally, the first cell is one of a TN cell and an NTN cell.

Optionally, the second cell is one of a TN cell and an NTN cell.

In the cell configuration of each SCell, the drx-HARQ-RTT-TimerDL may be configured based on Cell1 (i.e., corresponding to a "scheduling carrier" for the downlink PDSCH transmission of the SCell) where the PDCCH scheduling the downlink PDSCH transmission of the SCell is located and Cell2 (i.e., corresponding to a "feedback carrier" for the downlink PDSCH transmission of SCell) which corresponds to the PDSCH and where the PUCCH for feeding back HARQ feedback information is located.

If Cell1 and Cell2 are not the same cell, the terminal device may choose to configure the drx-HARQ-RTT-TimerDL by combining the RTT delays corresponding to the two serving cells Cell1 and Cell2.

If there is one TN cell and one NTN cell in the two serving cells Cell1 and Cell2, then the RTT delay for the TN cell may be omitted.

If both the above two serving cells Cell1 and Cell2 are TN cells, then the RTT delays for the two serving cells may be omitted when configuring the drx-HARQ-RTT-TimerDL.

If Cell1 and Cell2 are the same cell, the terminal device may configure an offset of drx-HARQ-RTT-TimerDL based on the RTT delay of the cell.

If both Cell1 and Cell2 are TN cells, the RTT delay of the TN cell may be omitted, i.e., offset=0.

Optionally, the operation of configuring the drx-HARQ-RTT-TimerDL based on the serving cell associated with the downlink PDSCH transmission includes the following implementations.

First Implementation 1.1) The offset for delaying a start of the drx-HARQ-RTT-TimerDL corresponding to the HARQ process is determined based on an RTT of the first cell and an RTT of the second cell.

Optionally, the operation of determining the offset for delaying the start of the drx-HARQ-RTT-TimerDL corresponding to the HARQ process based on the RTT of the first cell and the RTT of the second cell includes the following operation.

The offset is determined based on a first formula: offset=½RTT$_1$+½RTT$_2$.

RTT$_1$ is the RTT of the first cell, and RTT$_2$ is the RTT of the second cell.

Exemplarily, assuming that the RTT of the first cell is 100 ms and the RTT of the second cell is 10 ms, it can be known based on the formula that: offset=½100 ms+½10 ms=55 ms.

1.2) The start of the drx-HARQ-RTT-TimerDL is delayed based on the offset. That is to say, the terminal device starts the drx-HARQ-RTT-TimerDL after waiting for the offset time.

Second Implementation 2.1) The offset for delaying a start of the drx-HARQ-RTT-TimerDL corresponding to the HARQ process is determined based on the RTT of the first cell and the RTT of the second cell.

2.2) The duration of the drx-HARQ-RTT-TimerDL is prolonged based on the offset.

The operation of prolonging the duration of the drx-HARQ-RTT-TimerDL may also be understood as extending the duration of the drx-HARQ-RTT-TimerDL.

The drx-HARQ-RTT-TimerDL is started with a prolonged duration.

Optionally, the prolonged duration of the drx-HARQ-RTT-TimerDL is a total duration which is equal to a default duration of the drx-HARQ-RTT-TimerDL plus the offset. That is to say, at present, the default duration of the drx-HARQ-RTT-TimerDL originally exists, and the offset is added to this default duration, to obtain the prolonged duration of the drx-HARQ-RTT-TimerDL.

Third Implementation 3.1) If the first cell is a TN cell and the second cell is an NTN cell, the offset for delaying the start of the drx-HARQ-RTT-TimerDL is configured based on the RTT of the second cell.

Optionally, the operation of configuring the offset for delaying the start of the drx-HARQ-RTT-TimerDL based on the RTT of the second cell includes the following operation.

The offset is determined based on a second formula: offset=½RTT$_3$.

Currently, RTT$_3$ is the RTT of the second cell.

Exemplarily, assuming that the RTT of the second cell is 100 ms and the RTT of the first cell is 10 ms, then it can be known based on the formula that: offset=½100 ms=50 ms.

3.2) The start of the drx-HARQ-RTT-TimerDL is delayed based on the offset.

Optionally, in the embodiments of the present disclosure, the terminal device may obtain the RTT of the NTN cell based on at least one of the following information: location information of the terminal device, ephemeris information of the NTN cell, or feeder link delay information.

Optionally, in the embodiments of the present disclosure, the network device may send the ephemeris information of the NTN cell and/or the feeder link delay information to the terminal device.

Optionally, the ephemeris information of the NTN cell and/or the feeder link delay information is carried in at least one of the following messages: a broadcast message, a RRC dedicated signaling, a paging message, or a MAC CE.

That is, the network device may send the ephemeris information of the NTN cell and/or the feeder link delay information, carried in at least one of the broadcast message, a RRC dedicated signaling or a MAC CE message, to the terminal device.

Fourth Implementation 4.1) If the first cell is a TN cell and the second cell is an NTN cell, the offset for delaying the start of the drx-HARQ-RTT-TimerDL is configured based on the RTT of the second cell.

4.2) The duration of the drx-HARQ-RTT-TimerDL is prolonged based on the offset.

Fifth Implementation 5.1) If the first cell is an NTN cell and the second cell is a TN cell, the offset for delaying the start of the drx-HARQ-RTT-TimerDL is configured based on the RTT of the first cell.

Optionally, the operation of configuring the offset for delaying the start of the drx-HARQ-RTT-TimerDL based on the RTT of the first cell includes the following operation.

The offset is determined based on the second formula: offset=½$RTT_3$. Currently, $RTT_3$ is the RTT of the first cell.

5.2) The start of the drx-HARQ-RTT-TimerDL is delayed based on the offset.

Sixth Implementation 6.1) If the first cell is an NTN cell and the second cell is a TN cell, the offset for delaying the start of the drx-HARQ-RTT-TimerDL is configured based on the RTT of the first cell.

6.2) The duration of drx-HARQ-RTT-TimerDL is prolonged based on the offset.

In an operation 805, the terminal device starts the drx-HARQ-RTT-TimerDL.

An optional implementation is that: for the first, third and fifth implementations, the drx-HARQ-RTT-TimerDL may be started after waiting for the offset.

Another optional implementation is that: for the second, fourth and sixth implementations, the drx-HARQ-RTT-TimerDL with the prolonged duration may be started directly.

In an operation 806, after the drx-HARQ-RTT-TimerDL expires, if the downlink data transmitted by terminal device using the HARQ process is not decoded successfully, then the drx-Retransmission-TimerDL corresponding to the HARQ process is started.

In an operation 807, the terminal device starts to monitor the PDCCH.

The start conditions of the drx-Retransmission-TimerDL may include: (1) the drx-HARQ-RTT-Timer DL expires, and (2) the downlink PDSCH data transmitted by the HARQ process is not decoded successfully (that is, the terminal device feeds back a HARQ-NACK).

If the above conditions are met, the drx-Retransmission-TimerDL corresponding to the HARQ process may be started, and the start of the drx-Retransmission-TimerDL means that the terminal device starts to monitor the PDCCH.

Figure 9:
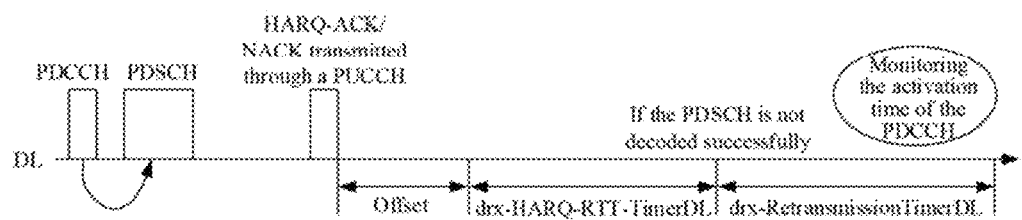
FIG. 9 is a second schematic diagram of starting and stopping conditions of a drx-RetransmissionTimerDL provided by an embodiment of the present disclosure.

Exemplarily, as shown in FIG. 9, for the first, third and fifth implementations, the above offset may delays the start of the drx-HARQ-RTT-TimerDL. FIG. 9 adds an offset before starting the drx-HARQ-RTT-TimerDL, compared to the start condition shown in FIG. 5.

Assuming that the offset is 50 ms, it may wait 50 ms before starting the drx-HARQ-RTT-TimerDL.

Figure 10:
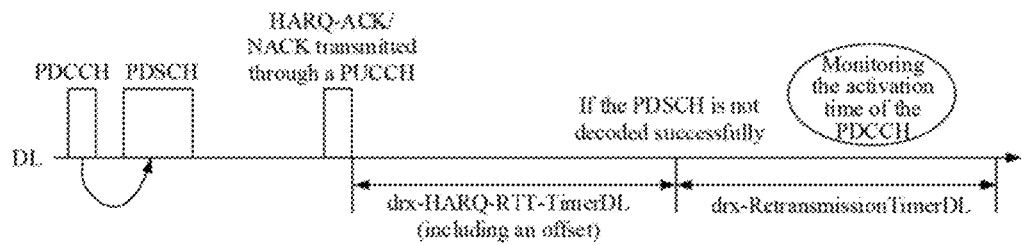
FIG. 10 is a second schematic diagram of starting and stopping conditions of a drx-RetransmissionTimerDL provided by an embodiment of the present disclosure.

Exemplarily, as shown in FIG. 10, for the second, fourth and sixth implementations, the above offset may prolongs a value range (i.e., a duration) of the drx-HARQ-RTT-TimerDL by adding the offset to the existing value range of the timer. FIG. 10 adds the offset to the value range of the drx-HARQ-RTT-TimerDL, compared to the start condition shown in FIG. 5.

Assuming that the value range of the existing drx-HARQ-RTT-TimerDL is 50 ms and the offset is 50 ms, the value range of the drx-HARQ-RTT-TimerDL may be prolonged to 100 ms.

In the above embodiments, a DRX method for downlink data transmission is provided. In the method, the drx-HARQ-RTT-TimerDL is configured through the serving cell associated with the downlink PDSCH transmission. In a transmission, when the serving cell associated with the uplink transmission is different from the serving cell associated with the downlink transmission, the drx-HARQ-RTT-TimerDL is configured based on the RTT of the first cell where the first PDCCH scheduling the downlink PDSCH transmission is located, and/or, the RTT of the second cell which corresponds to the downlink PDSCH transmission and where the second PUCCH for feeding back the HARQ feedback information is located, so that a suitable slot offset for delaying the start of the drx-HARQ-RTT-TimerDL can be determined, or the duration of the drx-HARQ-RTT-TimerDL may be prolonged, so as to achieve the purpose of power saving of the terminal device, or to enable the terminal device to start the drx-RetransmissionTimerDL at a suitable time to monitor the PDCCH.

Second Embodiment

Figure 11:
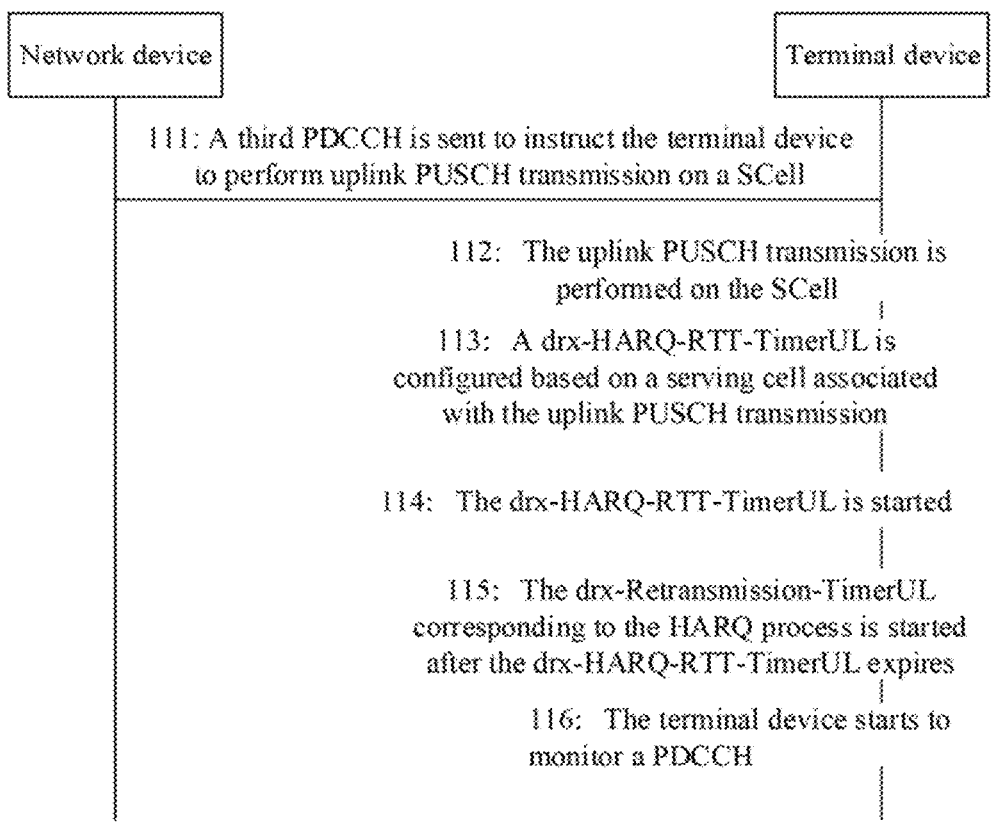
FIG. 11 is a second schematic diagram of a DRX method provided by an embodiment of the present disclosure.

As shown in FIG. 11, an embodiment of the present disclosure provides a DRX method. The method includes the following operations.

In an operation 111, the network device sends a third PDCCH to the terminal device to instruct the terminal device to perform uplink PUSCH transmission on an SCell.

Optionally, the terminal device may receive an RRC reconfiguration message from the network device, and the RRC reconfiguration message may configures one or more SCells.

Further, the network device may send the third PDCCH for instructing the terminal device to perform the uplink PUSCH transmission on the SCell to the terminal device. After receiving the third PDCCH, the terminal device may perform the following operation 112.

In the operation 112, the terminal device performs the uplink PUSCH transmission on the SCell.

Optionally, the embodiments of the present disclosure may be applied to the uplink PUSCH transmission process in the SCell in the CA scenario.

In an operation 113, the terminal device configures a drx-HARQ-RTT-TimerUL based on a serving cell associated with uplink PUSCH transmission.

Optionally, the serving cell associated with the uplink PUSCH transmission includes: (1) a third cell where a third PDCCH for scheduling the uplink PUSCH transmission is located; (2) a fourth cell where the uplink PUSCH transmission is located; or (3) the third cell and the fourth cell.

Optionally, the third cell is the same as the fourth cell.

Optionally, the third cell is different from the fourth cell.

Optionally, the third cell is one of a TN cell and an NTN cell.

Optionally, the fourth cell is one of a TN cell and an NTN cell.

For any one cell SCell3, in the cell configuration of the SCell3, the drx-HARQ-RTT-TimerUL may be configured based on SCell3 and Cell4 (i.e., corresponding to a "scheduling carrier" of the uplink PUSCH transmission of the SCell3) where the PDCCH scheduling the uplink PUSCH transmission of the SCell3 is located.

If SCell3 and Cell4 are not the same cell, the terminal device may configure the drx-HARQ-RTT-TimerUL by combining the RTT delays corresponding to the two serving cells SCell3 and Cell4.

If one TN cell and one NTN cell exist in the two serving cells SCell3 and Cell4, the RTT delay of the TN cell may be omitted.

If SCell3 and Cell4 are the same cell, the terminal device may optionally configure the offset of drx-HARQ-RTT-TimerUL based on the RTT delay of the cell.

If both SCell3 and Cell4 are TN cells, the terminal device may omit the RTT delay of the TN cell, i.e., offset=0.

Optionally, the operation of configuring the drx-HARQ-RTT-TimerUL based on the serving cell associated with the uplink PUSCH transmission includes the following implementations.

Implementation A

A.1) The offset for delaying a start of the drx-HARQ-RTT-TimerUL corresponding to the HARQ process is determined based on an RTT of the third cell and an RTT of the fourth cell.

Optionally, the operation of determining the offset for delaying the start of the drx-HARQ-RTT-TimerUL corresponding to the HARQ process based on the RTT of the third cell and the RTT of the fourth cell includes the following operation.

The offset is determined based on a third formula: offset=½$RTT_4$+½$RTT_5$.

$RTT_4$ is the RTT of the third cell and $RTT_5$ is the RTT of the fourth cell.

Exemplarily, assuming that the RTT of the third cell is 100 ms and the RTT of the fourth cell is 10 ms, it can be known based the formula that: offset=½100 ms+½10 ms=55 ms.

A.2) The start of the drx-HARQ-RTT-TimerUL is delayed based on the offset.

Implementation B

B.1) The offset for delaying a start of the drx-HARQ-RTT-TimerUL corresponding to the HARQ process is determined based on the RTT of the third cell and the RTT of the fourth cell.

B.2) The duration of the drx-HARQ-RTT-TimerUL is prolonged based on the offset.

Implementation C

C.1) If the third cell is a TN cell and the fourth cell is an NTN cell, the offset for delaying the start of the drx-HARQ-RTT-TimerUL is configured based on the RTT of the fourth cell.

The operation of configuring the offset for delaying the start of the drx-HARQ-RTT-TimerUL based on the RTT of the fourth cell includes the following operation.

The offset is determined based on a fourth formula: offset=½$RTT_6$.

Currently, $RTT_6$ is the RTT of the fourth cell.

C.2) The start of the drx-HARQ-RTT-TimerUL is delayed based on the offset.

Optionally, in the embodiments of the present disclosure, the terminal device may obtain the RTT of the NTN cell based on at least one of the following information: location information of a terminal device, ephemeris information of the NTN cell, or feeder link delay information.

Optionally, in the embodiments of the present disclosure, the network device may send the ephemeris information of the NTN cell and/or the feeder link delay information to the terminal device.

Optionally, the ephemeris information of the NTN cell and/or the feeder link delay information is carried in at least one of the following messages: a broadcast message, a RRC dedicated signaling, a paging message, or a MAC CE.

That is, the network device may send the ephemeris information of the NTN cell and/or the feeder link delay information, carried in at least one of the broadcast message, a RRC dedicated signaling or a MAC CE message, to the terminal device.

Implementation D

D.1) If the third cell is a TN cell and the fourth cell is an NTN cell, the offset for delaying the start of the drx-HARQ-RTT-TimerUL is configured based on the RTT of the fourth cell.

D.2) The duration of the drx-HARQ-RTT-TimerUL is prolonged.

Implementation E

E.1) If the third cell is an NTN cell and the fourth cell is a TN cell, the offset for delaying the start of the drx-HARQ-RTT-TimerUL is configured based on the RTT of the third cell.

The operation of configuring the offset for delaying the start of the drx-HARQ-RTT-TimerUL based on the RTT of the third cell includes the following operation.

The offset is determined based on the fourth formula: offset=½$RTT_6$.

Currently, $RTT_6$ is the RTT of the third cell.

Exemplarily, assuming that the RTT of the third cell is 100 ms and the RTT of the fourth cell is 10 ms, it can be known based on the formula that: offset=½100 ms=50 ms.

E.2) The start of the drx-HARQ-RTT-TimerUL is delayed based on the offset.

Implementation F

F.1) If the third cell is an NTN cell and the fourth cell is a TN cell, the offset for delaying the start of the drx-HARQ-RTT-TimerUL is configured based on the RTT of the third cell.

F.2) The duration of drx-HARQ-RTT-TimerUL is prolonged.

In an operation 114, the terminal device starts the drx-HARQ-RTT-TimerUL.

An optional implementation is: for the implementations A, C and E, the drx-HARQ-RTT-TimerUL may be started after waiting for the offset.

Another optional implementation is: for the implementations B, D and F, the drx-HARQ-RTT-TimerUL with the prolonged duration may be started directly.

In an operation 115, after the drx-HARQ-RTT-TimerUL expires, the terminal device starts the drx-Retransmission-TimerUL corresponding to the HARQ process.

In an operation 116, the terminal device starts to monitor the PDCCH.

Exemplarily, as shown in FIG. 11, for the implementations A, C and E, the above offset may delays the start of the drx-HARQ-RTT-TimerUL.

Assuming that the offset is 50 ms, it may wait 50 ms before starting the drx-HARQ-RTT-TimerUL. FIG. 11 adds an offset before starting drx-HARQ-RTT-TimerUL, compared to the start condition shown in FIG. 6.

Figure 12:
FIG. 12 is a third schematic diagram of starting and stopping conditions of a drx-RetransmissionTimerUL provided by an embodiment of the present disclosure.
Figure 13:
FIG. 13 is a third schematic diagram of starting and stopping conditions of a drx-RetransmissionTimerUL provided by an embodiment of the present disclosure.

Exemplarily, as shown in FIG. 12, for the implementations B, D and F, the offset may also prolongs the value range (i.e., duration) of the drx-HARQ-RTT-TimerUL by adding the offset to the existing value range of the timer. FIG. 12 adds the offset to the value range of the drx-HARQ-RTT-TimerUL, compared to the start condition shown in FIG. 6.

Assuming that the value range of existing drx-HARQ-RTT-TimerUL is 50 ms and the offset is 50 ms, the value range of the drx-HARQ-RTT-TimerUL may be extended to 100 ms.

In the above embodiments, a DRX method for the data transmission is provided. In the method, the drx-HARQ-RTT-TimerUL is configured through the serving cell associated with the PUSCH transmission. In a transmission, when the serving cell associated the uplink transmission is different from the serving cell associated with the downlink transmission, the drx-HARQ-RTT-TimerUL is configured based on the RTT of the third cell where the third PDCCH scheduling the uplink PUSCH transmission is located, and/or, the RTT of the fourth cell where the uplink PUSCH transmission is located, so that a suitable slot offset for delaying the start of the drx-HARQ-RTT-TimerUL can be determined, or the duration of the drx-HARQ-RTT-TimerUL may be prolonged, so as to achieve the purpose of power saving of the terminal device, or to enable the terminal device to start the drx-RetransmissionTimerUL at a suitable time to monitor the PDCCH.

Figure 14:
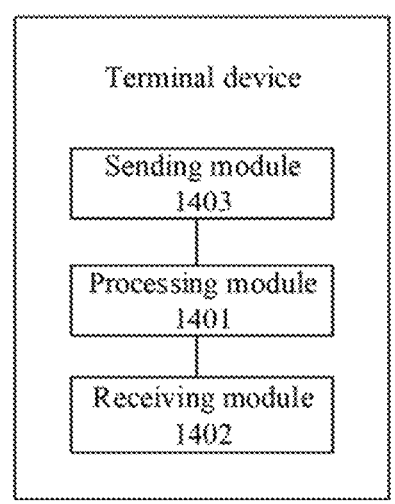
FIG. 14 is a schematic diagram of a structure of a terminal device provided by an embodiment of the present disclosure.

As shown in FIG. 14, an embodiment of the present disclosure provides a terminal device. The terminal device includes a processing module 1401.

The processing module 1401 is configured to configure a first discontinuous reception hybrid automatic repeat request round trip time timer (drx-HARQ-RTT-Timer) based on a round trip time (RTT) corresponding to a serving cell associated with a data transmission.

Optionally, the processing module 1401 is specifically configured to configure a slot offset for delaying a start of the first drx-HARQ-RTT-Timer.

Optionally, the processing module 1401 is specifically configured to prolong the duration of the first drx-HARQ-RTT-Timer.

Optionally, for an SCell in a carrier aggregation (CA) scenario, the processing module 1401 is specifically configured to configure the first drx-HARQ-RTT-Timer based on the RTT corresponding to the serving cell associated with the data transmission in the SCell.

Optionally, the data transmission is a downlink (DL) PDSCH transmission, and the processing module is specifically configured to configure a downlink discontinuous reception hybrid automatic repeat request round trip time timer (drx-HARQ-RTT-TimerDL) based on a serving cell associated with the DL PDSCH transmission.

Optionally, the serving cell associated with the DL PDSCH transmission includes a first cell and/or a second cell.

A first physical downlink control channel (PDCCH) for scheduling the DL PDSCH transmission is located in the first cell.

A second physical uplink control channel (PUCCH) for feeding back HARQ feedback information is located in the second cell, and the second cell corresponds to the DL PDSCH transmission.

The first cell is the same as or different from the second cell.

Optionally, the first cell is one of a terrestrial network (TN) cell and a non-terrestrial network (NTN) cell, and the second cell is one of a TN cell and an NTN cell.

Optionally, the terminal device further includes a receiving module 1402 and a sending module 1403.

The receiving module 1402 is configured to receive the first PDCCH before the processing module 1401 configures the drx-HARQ-RTT-TimerDL based on the serving cell associated with the DL PDSCH transmission, the first PDCCH indicates to perform the DL PDSCH transmission on the SCell. The receiving module is configured to perform the DL PDSCH transmission on the SCell.

The sending module 1403 is configured to send, on the second PUCCH, HARQ feedback information for a HARQ process of the DL PDSCH transmission.

Optionally, the processing module 1401 is specifically configured to determine, based on an RTT of the first cell and an RTT of the second cell, an offset for delaying a start of the drx-HARQ-RTT-TimerDL corresponding to the HARQ process.

Optionally, the processing module 1401 is specifically configured to determine the offset based on a first formula: offset=½RTT$_1$+½RTT$_2$. RTT$_1$ is the RTT of the first cell, and RTT$_2$ is the RTT of the second cell.

Optionally, the processing module 1401 is specifically configured to configure an offset for delaying a start of the drx-HARQ-RTT-TimerDL based on an RTT of the second cell when the first cell is a TN cell and the second cell is an NTN cell, and configure an offset for delaying the start of the drx-HARQ-RTT-TimerDL based on the RTT of the first cell when the first cell is the NTN cell and the second cell is the TN cell.

Optionally, the processing module 1401 is specifically configured to determine the offset based on a second formula: offset=½RTT$_3$.

RTT$_3$ is the RTT of the NTN cell.

Optionally, the processing module 1401 is further configured to delay the start of the drx-HARQ-RTT-TimerDL based on the offset.

Optionally, the processing module 1401 is further configured to prolong a duration of the drx-HARQ-RTT-TimerDL based on the offset and start the drx-HARQ-RTT-TimerDL with a prolonged duration.

Optionally, the prolonged duration of the prolonged drx-HARQ-RTT-TimerDL is a total duration which is equal to a default duration of the drx-HARQ-RTT-TimerDL plus the offset.

Optionally, the processing module 1401 is further configured to start a DL discontinuous reception retransmission timer (drx-Retransmission-TimerDL) corresponding to the HARQ process to monitor a PDCCH when the downlink data transmitted by the HARQ process is not decoded successfully after the drx-HARQ-RTT-TimerDL expires.

Optionally, the data transmission is an uplink (UL) physical uplink shared channel (PUSCH) transmission, and the processing module 1401 is specifically configured to configure an uplink discontinuous reception hybrid automatic repeat request round trip time timer (drx-HARQ-RTT-TimerUL) based on a serving cell associated with the UL PUSCH transmission.

Optionally, the serving cell associated with the UL PUSCH transmission includes a third cell and/or a fourth cell.

A third PDCCH for scheduling the UL PUSCH transmission is located in the third cell.

The UL PUSCH transmission is located in the fourth cell.

The third cell is the same as or different from the fourth cell.

Optionally, the third cell is one of a TN cell and an NTN cell, and the fourth cell is one of a TN cell and an NTN cell.

Optionally, the terminal device further includes the receiving module 1402 and the sending module 1403.

The receiving module 1402 is configured to receive the third PDCCH before the processing module 1401 configures the drx-HARQ-RTT-TimerUL based on the serving cell associated with the UL PUSCH transmission. The third PDCCH indicates to perform the UL PUSCH transmission on the SCell.

The sending module 1403 is configured to perform the UL PUSCH transmission on the SCell.

Optionally, the processing module 1401 is specifically configured to determine, based on an RTT of the third cell and an RTT of the fourth cell, an offset for delaying a start of the drx-HARQ-RTT-TimerUL corresponding to a HARQ process.

Optionally, the processing module 1401 is specifically configured to determine the offset based on a third formula: offset=½RTT$_4$+½RTT$_5$. RTT$_4$ is the RTT of the third cell, and RTT$_5$ is the RTT of the fourth cell.

Optionally, the processing module 1401 is specifically configured to configure an offset for delaying a start of the drx-HARQ-RTT-TimerUL based on the RTT of the fourth cell when the third cell is a TN cell and the fourth cell is an NTN cell; and configure the offset for delaying the start of the drx-HARQ-RTT-TimerUL based on the RTT of the third cell when the third cell is the NTN cell and the fourth cell is the TN cell.

Optionally, the processing module 1401 is specifically configured to determine the offset based on a fourth formula: offset=½RTT$_6$.

RTT$_6$ is the RTT of the NTN cell.

Optionally, the processing module 1401 is further configured to delay the start of the drx-HARQ-RTT-TimerUL based on the offset.

Optionally, the processing module 1401 is further configured to prolong the duration of the drx-HARQ-RTT-TimerUL based on the offset, and start the drx-HARQ-RTT-TimerUL with a prolonged duration.

Optionally, the prolonged duration of the prolonged drx-HARQ-RTT-TimerUL is a total duration which is equal to a default duration of the drx-HARQ-RTT-TimerUL plus the offset.

Optionally, the processing module 1401 is further configured to start a UL discontinuous reception retransmission timer (drx-Retransmission-TimerUL) corresponding to the HARQ process to monitor a PDCCH after the drx-HARQ-RTT-TimerUL expires.

Optionally, the RTT of the NTN cell is obtained based on at least one of the following information: location information of a terminal device, ephemeris information of the NTN cell, or feeder link delay information.

Optionally, the receiving module 1402 is further configured to receive the ephemeris information of the NTN cell, and/or the feeder link delay information sent by the network device.

Optionally, the ephemeris information of the NTN cell, and/or the feeder link delay information is carried in at least one of the following messages: a broadcast message, a radio resource control (RRC) dedicated signaling, a paging message, or a medium access control (MAC) control element (CE).

Figure 15:
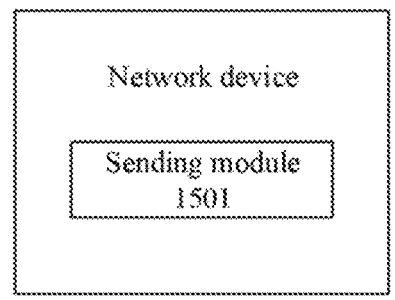
FIG. 15 is a schematic diagram of a structure of a terminal device provided by an embodiment of the present disclosure.

As shown in FIG. 15, an embodiment of the present disclosure provides a network device. The network device includes a sending module 1501.

The sending module 1501 is configured to send a target physical downlink control channel (PDCCH) to a terminal device. The target PDCCH instructs the terminal device to perform a data transmission.

Optionally, the target PDCCH instructs the terminal device to perform a data transmission on a secondary cell (SCell).

Optionally, the data transmission is downlink (DL) physical downlink shared channel (PDSCH) transmission, and the sending module is specifically configured to send a first PDCCH to the terminal device. The first PDCCH instructs the terminal device to perform the DL PDSCH transmission on the SCell.

Optionally, the data transmission is uplink (UL) physical uplink shared channel (PUSCH) transmission, and the sending module is specifically configured to send a third PDCCH to the terminal device. The third PDCCH instructs the terminal device to perform the UL PUSCH transmission on the SCell.

Optionally, the sending module 1501 is further configured to send feeder link delay information and/or ephemeris information of a non-terrestrial network (NTN) cell in a serving cell for the data transmission to the terminal device.

Optionally, a serving cell associated with the DL PDSCH transmission includes a first cell and/or a second cell.

A first PDCCH for scheduling the DL PDSCH transmission is located in the first cell.

The second cell corresponds to the DL PDSCH transmission, and the second cell includes a second PUCCH for the terminal device to feed back hybrid automatic repeat request (HARD) feedback information.

Optionally, the serving cell associated with the UL PUSCH transmission includes a third cell and/or a fourth cell.

A third PDCCH for scheduling the UL PUSCH transmission is located in the third cell.

The uplink PUSCH transmission is located in the fourth cell.

An embodiment of the present disclosure further provides a terminal device. The terminal device includes a memory storing executable program codes, and a processor coupled to the memory.

The processor invokes the executable program codes stored in the memory to execute the DRX method performed by the terminal device in the embodiments of the present disclosure.

An embodiment of the present disclosure further provides a network device. The network device includes a memory storing executable program codes, and a processor coupled to the memory.

The processor invokes the executable program codes stored in the memory to execute the DRX method performed by the network device in the embodiments of the present disclosure.

Figure 16:
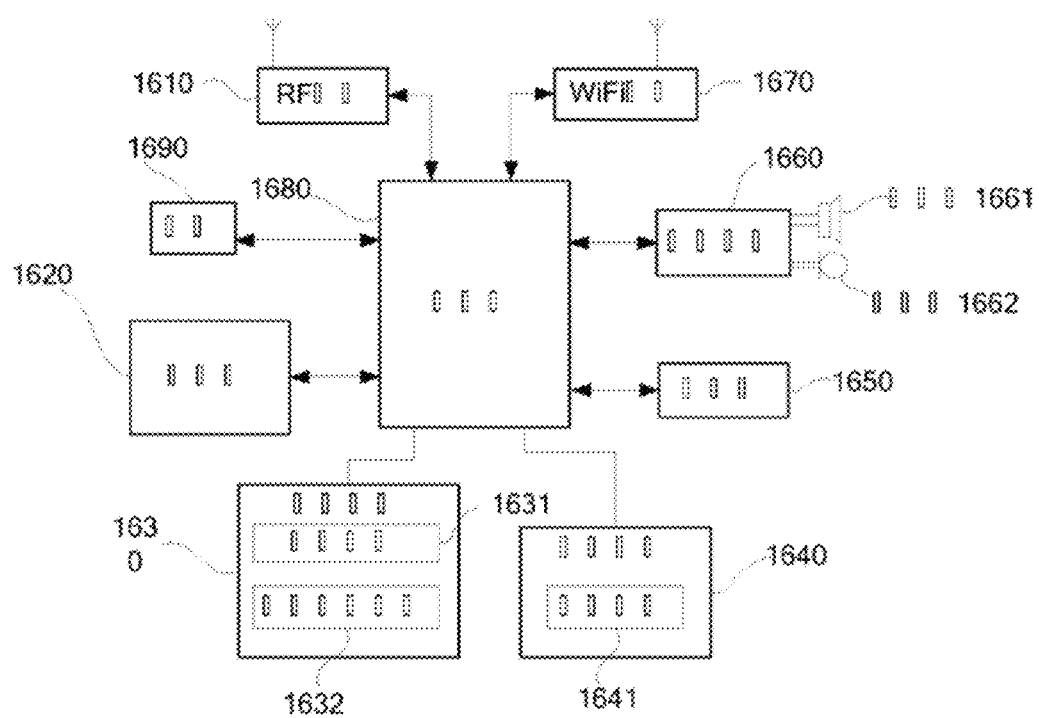
FIG. 16 is a schematic diagram of a structure of a mobile phone provided by an embodiment of the present disclosure.

Exemplarily, the terminal device in the embodiment of the present disclosure may be a mobile phone. As shown in FIG. 16, the mobile phone may include components such as a radio frequency (RF) circuit 1610, a memory 1620, an input unit 1630, a display unit 1640, a sensor 1650, an audio circuit 1660, a wireless fidelity (Wi-Fi) module 1670, a processor 1680, and a power supply 1690. The RF circuit 1610 includes a receiver 1611 and a transmitter 1612. It will be understood by those skilled in the art will that the structure of the mobile phone shown in FIG. 16 does not constitute a limitation of the mobile phone and may include more or fewer components than illustrated, or a combination of certain components, or different component arrangements.

The RF circuit 1610 may be used for receiving and sending signals during sending and receiving information or talking process. In particular, after the RF circuit 1610 receives downlink information from the base station, the downlink information is processed by the processor 1680. In addition, the RF circuit 1610 sends the uplink data to the base station. Typically, the RF circuit 1610 includes, but is not limited to, an antenna, at least one amplifier, a transceiver, a coupler, a low noise amplifier (LNA), a diplexer, etc. In addition, the RF circuit 1610 may also communicate with a network and other devices through wireless communication. These wireless communication may use any of the communication standard or protocol, which includes but not limited to global system of mobile communication (GSM), general packet radio service (GPRS), code division multiple access (CDMA), wideband code division multiple access (WCDMA), long term evolution (LTE), E-mail, short messaging service (SMS), etc.

The memory 1620 may be used to store software programs and modules. The processor 1680 performs various functional applications and data processing of the mobile phone by running the software programs and modules stored in the memory 1620. The memory 1620 may mainly include a storage program area and a storage data area. The storage program area may store an operating system, an application program required for at least one function (such as a sound playback function, an image playback function, etc.), etc. The storage data area may store data (such as audio data, phone book, etc.) created based on the use of the mobile phone. Additionally, the memory 1620 may include high-speed random access memory, and may also include non-volatile memory such as at least one disk memory device, flash memory device, or other volatile solid-state memory device.

The input unit 1630 may be used to receive input numeric or character information, and to generate key signal input related to user settings and function control of the mobile phone. Specifically, the input unit 1630 may include a touch panel 1631 and other input devices 1632. The touch panel 1631, also referred to as a touch screen, may collect user touch operations on or near the touch panel 1631 (such as user operations on or near the touch panel 1631 using any suitable object or accessory such as a finger, stylus, etc.) and drive corresponding connection devices based on a preset program. Alternatively, the touch panel 1631 may include a touch detection device and a touch controller. The touch detection device detects user' touch orientation, detects a signal resulting from the touch operation, and transmits the signal to the touch controller. The touch controller receives touch information from the touch detection device, converts it into contact coordinates, which are then sent to the processor 1680, and the touch controller receives and executes commands from the processor 1680. In addition, the touch panel 1631 can be implemented in various types such as resistive, capacitive, infrared and surface acoustic waves. The input unit 1630 may include other input devices 1632 in addition to the touch panel 1631. Specifically, the other input devices 1632 may include, but are not limited to, one or more of the following: a physical keyboard, function keys (such as volume control keys, switch keys, etc.), a trackball, a mouse, a joystick, etc.

The display unit 1640 may be used to display information input by or provided to a user, as well as various menus of a mobile phone. The display unit 1640 may include a display panel 1641, which may optionally be configured in the form of a liquid crystal display (LCD), an organic light-emitting diode (OLED), etc. Further, the touch panel 1631 may cover the display panel 1641, and when the touch panel 1631 detects a touch operation on or near it, it is transmitted to the processor 1680 to determine a type of touch event, and then the processor 1680 provides a corresponding visual output on the display panel 1641 based on the type of touch event. Although the touch panel 1631 and the display panel 1641 are taken as two independent components to implement the input and output functions of the mobile phone in FIG. 16, in some embodiments, the touch panel 1631 may be integrated with the display panel 1641 to implement the input and output functions of the mobile phone.

The mobile phone may also include at least one sensor 1650, such as an optical sensor, a motion sensor and other sensors. Specifically, the optical sensor may include an ambient optical sensor and a proximity sensor. The ambient optical sensor can adjust the brightness of the display panel 1641 based on the brightness of the ambient light. The proximity sensor can turn off the display panel 1641 and/or the backlight when the mobile phone moves to the ear. As a type of motion sensor, an accelerometer sensor may detect the accelerations in all directions (generally three axes), and detect the magnitude and direction of gravity when the mobile phone is stationary. The accelerometer sensor may be used to identify the attitude of mobile phone (such as horizontal and vertical screen switching, related games, magnetometer attitude calibration), identify related vibration functions (such as pedometer, knocking), etc. The mobile phone may be further configured with a gyroscope, a barometer, a hygrometer, a thermometer, an infrared sensor, etc., which are not described here.

The audio circuit 1660, a speaker 1661, a microphone 1662 may provide an audio interface between the user and the mobile phone. The audio circuit 1660 may transmit the electrical signals converted by the received audio data to the speaker 1661, and the speaker 1661 converts the electrical signals into audio signals for output. On the other hand, the microphone 1662 converts the collected audio signals into electrical signals, the electrical signals are received by the audio circuit 1660 and are converted into audio data, and then the audio data is output to the processor 1680 for processing. Then the audio data is transmitted to, for example, another mobile phone via the RF circuit 1610, or the audio data is output to the memory 1620 for further processing.

Wi-Fi is a short-distance wireless transmission technology. Mobile phone can help users send and receive e-mails, browse webs and access streaming media through Wi-Fi module 1670, which provides users with wireless broadband internet access. Although FIG. 16 illustrates the Wi-Fi module 1670, it should be understood that it is not an essential component of the mobile phone and may be omitted as necessary without changing the essence of the present disclosure.

The processor 1680 is a control center of the mobile phone, and connects various parts of the whole mobile phone using various interfaces and lines, to perform various functions of the mobile phone and process data by running or executing software programs and/or modules stored in the memory 1620, and by invoking data stored in the memory 1620, thereby providing overall monitoring of the mobile phone. Optionally, the processor 1680 may include one or more processing units. Preferably, the processor 1680 may integrate an application processor and a modem processor.

The application processor mainly processes operating systems, user interfaces, applications, etc., and the modem processor mainly processes wireless communication. It should be understood that the modem processor described above may also not be integrated into the processor 1680.

The mobile phone also includes a power supply 1690 (such as a battery) for supplying power to various components. Preferably, the power supply may be logically connected to the processor 1680 through a power management system, thereby realizing functions such as managing charging, discharging, and power consumption management through the power management system. Although not shown, the mobile phone may also include a camera, a bluetooth module, etc., which are not described here.

In the embodiment of the present disclosure, the processor 1680 is configured to configure a first discontinuous reception hybrid automatic repeat request round trip time timer (drx-HARQ-RTT-Timer) based on a round trip time (RTT) corresponding to a serving cell associated with a data transmission.

Optionally, the processor 1680 is specifically configured to configure a slot offset for delaying a start of the first drx-HARQ-RTT-Timer, or the processor is specifically configured to prolong duration of the first drx-HARQ-RTT-Timer.

Optionally, the processor 1680 is specifically configured to configure the first drx-HARQ-RTT-Timer based on the RTT corresponding to the serving cell associated with the data transmission in a secondary cell (SCell) for the SCell in a carrier aggregation (CA) scenario.

Optionally, the data transmission is downlink (DL) physical downlink shared channel (PDSCH) transmission, and the processor is specifically configured to configure a downlink discontinuous reception hybrid automatic repeat request round trip time timer (drx-HARQ-RTT-TimerDL) based on a serving cell associated with the DL PDSCH transmission.

Optionally, the serving cell associated with the DL PDSCH transmission includes a first cell and/or a second cell.

A first physical downlink control channel (PDCCH) for scheduling the DL PDSCH transmission is located in the first cell.

A second physical uplink control channel (PUCCH) for feeding back HARQ feedback information is located in the second cell, and the second cell corresponds to the DL PDSCH transmission.

The first cell is the same as or different from the second cell.

Optionally, the first cell is one of a terrestrial network (TN) cell and a non-terrestrial network (NTN) cell, and the second cell is one of a TN cell and an NTN cell.

The second cell is one of a TN cell and an NTN cell.

Optionally, the terminal device further includes the RF circuit 1610.

The RF circuit 1610 is configured to receive the first PDCCH before the processor 1680 configures the drx-HARQ-RTT-TimerDL based on the serving cell associated with the DL PDSCH transmission, the first PDCCH indicates to perform the DL PDSCH transmission on the SCell. The RF circuit is configured to perform the DL PDSCH transmission on the SCell.

The RF circuit 1610 is configured to send, on the second PUCCH, HARQ feedback information for a HARQ process of the DL PDSCH transmission.

Optionally, the processor 1680 is specifically configured to determine, based on an RTT of the first cell and an RTT of the second cell, an offset for delaying a start of the drx-HARQ-RTT-TimerDL corresponding to the HARQ process.

Optionally, the processor 1680 is specifically configured to determine the offset based on a first formula: offset=½RTT$_1$+½RTT$_2$. RTT$_1$ is the RTT of the first cell, and RTT$_2$ is the RTT of the second cell.

Optionally, the processor 1680 is specifically configured to configure an offset for delaying the start of the drx-HARQ-RTT-TimerDL based on the RTT of the second cell when the first cell is a TN cell and the second cell is an NTN cell; and the processor is specifically configured to configure an offset for delaying the start of the drx-HARQ-RTT-TimerDL based on the RTT of the first cell when the first cell is the NTN cell and the second cell is the TN cell.

Optionally, the processor 1680 is specifically configured to determine the offset based on a second formula: offset=½RTT$_3$.

RTT$_3$ is the RTT of the NTN cell.

Optionally, the processor 1680 is further configured to delay the start of the drx-HARQ-RTT-TimerDL based on the offset.

Optionally, the processor 1680 is further configured to prolong a duration of the drx-HARQ-RTT-TimerDL based on the offset, and start the prolonged drx-HARQ-RTT-TimerDL.

Optionally, a total duration of the prolonged drx-HARQ-RTT-TimerDL is equal to a default duration of the drx-HARQ-RTT-TimerDL plus the offset Optionally, the processor 1680 is further configured to start a DL discontinuous reception retransmission timer (drx-Retransmission-TimerDL) corresponding to the HARQ process to monitor a PDCCH when downlink data transmitted by the HARQ process is not decoded successfully after the drx-HARQ-RTT-TimerDL expires.

Optionally, the data transmission is an uplink (UL) physical uplink shared channel (PUSCH) transmission, and the processor 1680 is specifically configured to configure an uplink discontinuous reception hybrid automatic repeat request round trip time timer (drx-HARQ-RTT-TimerUL) based on a serving cell associated with the UL PUSCH transmission.

Optionally, the serving cell associated with the UL PUSCH transmission includes a third cell and/or a fourth cell.

A third PDCCH for scheduling the UL PUSCH transmission is located in the third cell.

The UL PUSCH transmission is located in the fourth cell.

The third cell is the same as or different from the fourth cell.

Optionally, the third cell is one of a TN cell and an NTN cell, and the fourth cell is one of a TN cell and an NTN cell.

Optionally, the terminal device further includes the RF circuit 1610.

The RF circuit 1610 is configured to receive the third PDCCH before the processor 1680 configures the drx-HARQ-RTT-TimerUL based on the serving cell associated with the UL PUSCH transmission. The third PDCCH indicates to perform the UL PUSCH transmission on the SCell.

The RF circuit 1610 is configured to perform the UL PUSCH transmission on the SCell.

Optionally, the processor 1680 is specifically configured to determine, based on an RTT of the third cell and an RTT of the fourth cell, an offset for delaying the start of the drx-HARQ-RTT-TimerUL corresponding to the HARQ process.

Optionally, the processor 1680 is specifically configured to determine the offset based on a third formula: offset=½RTT$_4$+½RTT$_5$. RTT$_4$ is the RTT of the third cell, and RTT$_5$ is the RTT of the fourth cell.

Optionally, the processor 1680 is specifically configured to configure the offset for delaying the start of the drx-HARQ-RTT-TimerUL based on the RTT of the fourth cell when the third cell is a TN cell and the fourth cell is a NTN cell; and configure the offset for delaying the start of the drx-HARQ-RTT-TimerUL based on the RTT of the third cell when the third cell is the NTN cell and the fourth cell is the TN cell.

Optionally, the processor 1680 is specifically configured to determine the offset based on a fourth formula: offset=½RTT$_6$.

RTT$_6$ is the RTT of the NTN cell.

Optionally, the processor 1680 is further configured to delay the start of the drx-HARQ-RTT-TimerUL based on the offset.

Optionally, the processor 1680 of the terminal device is further configured to prolong the duration of the drx-HARQ-RTT-TimerUL based on the offset, and start the prolonged drx-HARQ-RTT-TimerUL.

Optionally, a total duration of the prolonged drx-HARQ-RTT-TimerUL is equal to a default duration of the drx-HARQ-RTT-TimerUL plus the offset.

Optionally, the processor 1680 is further configured to start a UL discontinuous reception retransmission timer (drx-Retransmission-TimerUL) corresponding to the HARQ process to monitor the PDCCH after the drx-HARQ-RTT-TimerUL expires.

Optionally, the RTT of the NTN cell is obtained based on at least one of the following information: location information of a terminal device, ephemeris information of the NTN cell, or feeder link delay information.

Optionally, the RF circuit 1610 is further configured to receive the ephemeris information of the NTN cell, and/or the feeder link delay information sent by the network device.

Optionally, the ephemeris information of the NTN cell, and/or the feeder link delay information is carried in at least one of the following messages: a broadcast message, a RRC dedicated signaling, a paging message, or an MAC CE.

Figure 17:
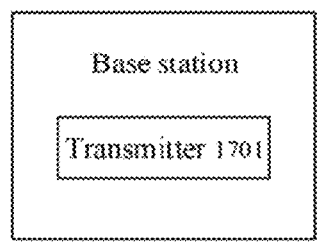
FIG. 17 is a schematic diagram of a structure of a base station provided by an embodiment of the present disclosure.

Exemplarily, as shown in FIG. 17, the network device in an embodiment of the present disclosure may be a base station. The base station includes a transmitter 1701.

The transmitter 1701 is configured to send a target PDCCH for instructing the terminal device to perform a data transmission to a terminal device.

Optionally, the target PDCCH instructs the terminal device to perform a data transmission on an SCell.

Optionally, the data transmission is DL PDSCH transmission, and the transmitter is specifically configured to send a first PDCCH to the terminal device. The first PDCCH instructs the terminal device to perform the DL PDSCH transmission on the SCell.

Optionally, the data transmission is UL PUSCH transmission, and the transmitter is specifically configured to send a third PDCCH to the terminal device. The third PDCCH instructs the terminal device to perform the UL PUSCH transmission on the SCell.

Optionally, the transmitter 1701 is further configured to send feeder link delay information and/or ephemeris information of a non-terrestrial network (NTN) cell in a serving cell for the data transmission to the terminal device.

Optionally, a serving cell associated with the DL PDSCH transmission includes a first cell and/or a second cell.

A first PDCCH for scheduling the DL PDSCH transmission is located in the first cell.

The second cell corresponds to the DL PDSCH transmission, and the second cell includes a second PUCCH for the terminal device to feed back hybrid automatic repeat request (HARD) feedback information.

Optionally, the serving cell associated with the UL PUSCH transmission includes a third cell and/or a fourth cell.

A third PDCCH for scheduling the UL PUSCH transmission is located in the third cell.

The uplink PUSCH transmission is located in the fourth cell.

According to the DRX method, the terminal device and the network device provided by the embodiments of the present disclosure provide, an implementable solution is provided for configuring drx-HARQ-RTT-TimerDL(UL), which solves the problem that in the CA scenario, the existing configuration method of drx-HARQ-RTT-TimerDL (UL) cannot achieve power saving of the terminal device, or may cause the terminal device to start the drx-RetransmissionTimerDL(UL) at the wrong time to monitor the PDCCH and miss the retransmission scheduling.

In particular, according to the DRX method provided by the embodiments of present disclosure, the drx-HARQ-RTT-TimerDL(UL) is configured based on an RTT of the serving cell associated with a data transmission. Therefore, for the situation that one uplink/downlink HARQ transmission and a possible subsequent retransmission scheduling are on different carriers (serving cells), the drx-HARQ-RTT-TimerDL(UL) can be configured based on the RTT of the serving cell associated with the uplink HARQ transmission and/or the RTT of the serving cell associated with the downlink HARQ transmission, so that a suitable slot offset for delaying a start of the drx-HARQ-RTT-TimerDL(UL) can be determined, or a duration of the drx-HARQ-RTT-TimerDL(UL) can be prolonged, so as to achieve the purpose of power saving of the terminal device, or cause the terminal device to start the drx-RetransmissionTimerDL (UL) at a suitable time to monitor PDCCH.

An embodiment of the present disclosure further provides a computer-readable storage medium including computer instructions that, when run on a computer, causes the computer to perform various processes of the terminal device in the method embodiments described above.

An embodiment of the present disclosure further provides a computer-readable storage medium including computer instructions that, when run on a computer, causes the computer to perform various processes of the network device in the method embodiments described above.

An embodiment of the present disclosure further provides a computer program product including computer instructions that, when run on a computer, causes the computer to run the computer instructions, such that the computer performs various processes of the terminal device in the method embodiments described above.

An embodiment of the present disclosure further provides a computer program product including computer instructions that, when run on a computer, causes the computer to run the computer instructions, such that the computer performs various processes of the terminal device in the method embodiments described above.

An embodiment of the present disclosure further provides a chip, which is coupled to a memory in the terminal device, such that the chip invokes program instructions stored in the memory when running, causing the terminal device to perform various processes of the terminal device in the method embodiments described above.

An embodiment of the present disclosure further provides a chip, which is coupled to a memory in the terminal device, such that the chip invokes program instructions stored in the memory when running, causing the terminal device to perform various processes of the terminal device in the method embodiments described above.

The above-described embodiments may be implemented in whole or in part by software, hardware, firmware or any combination thereof. When implemented using software, they can be implemented in whole or in part in the form of a computer program product. The computer program product includes one or more computer instructions. When computer program instructions are loaded and executed on a computer, the processes or functions are generated in whole or in part according to embodiments of the present disclosure. The computer may be a general purpose computer, a special purpose computer, a computer network, or other programmable device. The computer instructions may be stored in a computer-readable storage medium, or is transmitted from one computer-readable storage medium to another computer-readable storage medium. For example, the computer instructions may be transmitted from one web site, computer, server, or data center to another web site, computer, server, or data center via wired (e.g., coaxial cable, optical fiber, digital subscriber line (DSL)) or wireless (e.g., infrared, wireless, microwave, etc.) manners. The computer-readable storage medium may be any available medium that a computer can store, or a data storage device such as a server, data center, etc., that contains one or more available medium integration. The available medium may be magnetic medium (e.g. floppy disk, hard disk, magnetic tape), optical medium (e.g. DVD), or semiconductor medium (e.g. Solid State Disk (SSD)), etc.

The terms "first", "second", "third", "fourth", etc., (if present) in the description, claims and the accompanying drawings of the present disclosure are used to distinguish similar objects and not used to describe a particular order or sequence. It should be understood that the data used in this way is interchangeable where appropriate, so that the embodiments described herein can be implemented in an order other than that illustrated or described herein. In addition, the terms "including" and "having" and any variations of them are intended to cover non-exclusive inclusion, for example, a process, method, system, product, or device that includes a series of steps or units, which are not limited to those clearly listed, but may include other steps or units that are not clearly listed or inherent to such processes, methods, products, or devices.

The invention claimed is:

1. A discontinuous reception (DRX) method, comprising:
configuring, by a terminal device, a first discontinuous reception hybrid automatic repeat request round trip time timer (drx-HARQ-RTT-Timer) based on a round trip time (RTT) corresponding to a serving cell associated with a data transmission; and
performing by the terminal device, monitoring of a physical downlink control channel (PDCCH) after the drx-HARO-RTT-Timer expires,
wherein when the data transmission is an uplink (UL) physical uplink shared channel (PUSCH) transmission, configuring the first drx-HARO-RTT-Timer based on the RTT corresponding to the serving cell associated with the data transmission comprises:
configuring, by the terminal device, an uplink discontinuous reception hybrid automatic repeat request round trip time timer (drx-HARO-RTT-TimerUL) based on a serving cell associated with the UL PUSCH transmission,
wherein the serving cell associated with the UL PUSCH transmission comprises at least one of:
a third cell where a third physical downlink control channel (PDCCH) for scheduling the UL PUSCH transmission is located: or
a fourth cell where the UL PUSCH transmission is located,
wherein the third cell is the same as or different from the fourth cell.

2. The method of claim 1, wherein configuring the first drx-HARQ-RTT-Timer comprises:
configuring an offset for delaying a start of the first drx-HARQ-RTT-Timer; or
prolonging a duration of the first drx-HARQ-RTT-Timer.

3. The method of claim 1, wherein configuring the first drx-HARQ-RIT-Timer based on the RTT corresponding to the serving cell associated with the data transmission comprises:
for a secondary cell (SCell) in a carrier aggregation (CA) scenario, configuring the first drx-HARQ-RTT-Timer based on the RTT corresponding to the serving cell associated with the data transmission in the SCell.

4. The method of claim 1, wherein when the data transmission is a downlink (DL) physical downlink shared channel (PDSCH) transmission,
configuring the first drx-HARQ-RTT-Timer based on the RTT corresponding to the serving cell associated with the data transmission comprises:
configuring a downlink discontinuous reception hybrid automatic repeat request round trip time timer (drx-HARQ-RIT-TimerDL) based on a serving cell associated with the DL PDSCH transmission.

5. The method of claim 4, wherein the serving cell associated with the DL PDSCH transmission comprises at least one of:
a first cell where a first PDCCH for scheduling the DL PDSCH transmission is located; or
a second cell which corresponds to the DL PDSCH transmission and where a second physical uplink control channel (PUCCH) for feeding back HARQ feedback information is located,
wherein the first cell is the same as or different from the second cell.

6. The method of claim 5, further comprising: before configuring the drx-HARQ-RTT-TimerDL based on the serving cell associated with the DL PDSCH transmission,
receiving the first PDCCH indicating to perform the DL PDSCH transmission on an SCell;
performing the DL PDSCH transmission on the SCell; and
sending, on the second PUCCH, HARQ feedback information for a HARQ process of the DL PDSCH transmission.

7. The method of claim 6, wherein configuring the drx-HARQ-RTT-TimerDL based on the serving cell associated with the DL PDSCH transmission comprises:
determining, based on an RTT of the first cell and an RTT of the second cell, an offset for delaying a start of the drx-HARQ-RTT-TimerDL corresponding to the HARQ process.

8. The method of claim 6, wherein determining, based on the RTT of the first cell and the RTT of the second cell, the offset for delaying the start of the drx-HARQ-RTT-TimerDL corresponding to the HARQ process comprises:

determining the offset based on a first formula:

$$\text{offset}=\tfrac{1}{2}\text{RTT}_1+\tfrac{1}{2}\text{RTT}_2,$$

wherein $\text{RTT}_1$ is the RTT of the first cell, and $\text{RTT}_2$ is the RTT of the second cell.

9. The method of claim 6, wherein configuring the drx-HARQ-RTT-TimerDL based on the serving cell associated with the DL PDSCH transmission comprises:
in response to the first cell being a TN cell and the second cell being an NTN cell, configuring an offset for delaying a start of the drx-HARQ-RTT-TimerDL based on an RTT of the second cell; or
in response to the first cell being an NTN cell and the second cell being a TN cell, configuring an offset for delaying a start of the drx-HARQ-RTT-TimerDL based on an RTT of the first cell,
wherein configuring the offset for delaying the start of the drx-HARQ-RTT-TimerDL based on the RIT of the second cell or configuring the offset for delaying the start of the drx-HARQ-RTT-TimerDL based on the RTT of the first cell comprises:
determining the offset based on a second formula:

$$\text{offset}=\tfrac{1}{2}\text{RTT}_3,$$

wherein $\text{RTT}_3$ is the Rr of the NTN cell.

10. The method of claim 7, further comprising:
prolonging a duration of the drx-HARQ-RTT-TimerDL based on the offset; and
starting the drx-HARQ-RTT-TimerDL with a prolonged duration.

11. The method of claim 10, wherein the prolonged duration of the drx-HARQ-RTT-TimerDL is a total duration which is equal to a default duration of the drx-HARQ-RTT-TimerDL plus the offset.

12. The method of claim 1, further comprising: before configuring the drx-HARQ-RTT-TimerUL based on the serving cell associated with the UL PUSCH transmission,
receiving the third PDCCH indicating to perform the UL PUSCH transmission on an SCell; and
performing the UL PUSCH transmission on the SCell,
wherein configuring the drx-HARQ-RTT-TimerUL based on the serving cell associated with the UL PUSCH transmission comprises:
determining, based on an RTT of the third cell and an RTT of the fourth cell, an offset for delaying a start of the drx-HARQ-RTT-TimerUL corresponding to a HARQ process.

13. The method of claim 12, wherein determining, based on the RTT of the third cell and the RTT of the fourth cell, the offset for delaying the start of the drx-HARQ-RTT-TimerUL corresponding to the HARQ process comprises:
determining the offset based on a third formula:

$$\text{offset}=\tfrac{1}{2}\text{RTT}_4+\tfrac{1}{2}\text{RTT}_5,$$

wherein $\text{RTT}_4$ is the RTT of the third cell, and $\text{RTT}_5$ is the RTT of the fourth cell.

14. The method of claim 12, wherein configuring the drx-HARQ-RTT-TimerUL based on the serving cell associated with the UL PUSCH transmission comprises:
in response to the third cell being a TN cell and the fourth cell being an NTN cell, configuring an offset for delaying a start of the drx-HARQ-RTT-TimerUL based on an RTT of the fourth cell; or
in response to the third cell being an NTN cell and the fourth cell being a TN cell, configuring an offset for delaying a start of the drx-HARQ-RTT-TimerUL based on an Rn of the third cell,
wherein configuring the offset for delaying the start of the drx-HARQ-RTT-TimerUL based on the RTT of the fourth cell or configuring the offset for delaying the start of the drx-HARQ-RTT-TimerUL based on the RTT of the third cell comprises:
determining the offset based on a fourth formula:

$$\text{offset}=\tfrac{1}{2}\text{RTT}_6,$$

wherein $\text{RTT}_6$ is the RTT of the NTN cell.

15. The method of claim 12, further comprising:
prolonging a duration of the drx-HARQ-RTT-TimerUL based on the offset; and
starting the drx-HARQ-RTT-TimerUL with a prolonged duration.

16. The method of claim 15, wherein the prolonged duration of the drx-HARQ-RTT-TimerUL is a total duration which is equal to a default duration of the drx-HARQ-RTT-TimerUL plus the offset.

17. A terminal device comprising a memory and a processor, the memory storing a computer program that, when executed by the processor, causes the terminal device to:
configure a first discontinuous reception hybrid automatic repeat request round trip time timer (drx-HARQ-RTT-Timer) based on a round trip time (RTT) corresponding to a serving cell associated with a data transmission; and
perform monitoring of a physical downlink control channel (PDCCH) after the drx-HARO-RTT-Timer expires,
wherein when the data transmission is an uplink (UL) physical uplink shared channel (PUSCH) transmission, the processor is further configured to execute the computer program to cause the terminal device to:
configure an uplink discontinuous reception hybrid automatic repeat request round trip time timer (drx-HARO-RTT-TimerUL) based on a serving cell associated with the UL PUSCH transmission,
wherein the serving cell associated with the UL PUSCH transmission comprises at least one of:
a third cell where a third physical downlink control channel (PDCC) for scheduling the UL PUSCH transmission is located: or
a fourth cell where the UL PUSCH transmission is located,
wherein the third cell is the same as or different from the fourth cell.

18. A network device comprising a memory, a transceiver and a processor, the memory storing a computer program that, when executed by the processor, causes the processor, through the transceiver, to:
transmit, to a terminal device, a physical downlink control channel (PDCCH), to cause the terminal device to perform monitoring of the PDCCH after a discontinuous reception hybrid automatic repeat request round trip time timer (drx-HARO-RTT-Timer) expires:
wherein the drx-HARO-RTT-Timer is configured based on a round trip time (RTT) corresponding to a serving cell associated with a data transmission;
wherein when the data transmission is an uplink (UL) physical uplink shared channel (PUSCH) transmission, an uplink discontinuous reception hybrid automatic repeat request round trip time timer (drx-HARO-RTT-TimerUL) is configured based on a serving cell associated with the UL PUSCH transmission,
wherein the serving cell associated with the UL PUSCH transmission comprises at least a third cell where a third PDCCH for scheduling the UL PUSCH transmission is located;

a fourth cell where the UL PUSCH transmission is located,
wherein the third cell is the same as or different from the fourth cell.

* * * * *